(12) United States Patent
Landon et al.

(10) Patent No.: US 9,219,600 B1
(45) Date of Patent: Dec. 22, 2015

(54) SYNCHRONIZATION THROUGH WAVEFORM CORRELATION

(71) Applicant: L-3 Communications Corp., New York, NY (US)

(72) Inventors: David G. Landon, Bountiful, UT (US); David S. Nelson, Salt Lake City, UT (US); Robert L. Dickson, Solana Beach, CA (US); Brian G. Yoho, Salt Lake City, UT (US); Carl Christensen, South Jordan, UT (US)

(73) Assignee: L-3 Communications Corp., New York, NY (US)

( * ) Notice: Subject to any disclaimer, the term of this patent is extended or adjusted under 35 U.S.C. 154(b) by 0 days.

(21) Appl. No.: 14/631,506

(22) Filed: Feb. 25, 2015

(51) Int. Cl.
    *H04L 7/033* (2006.01)
    *H04L 7/00* (2006.01)
(52) U.S. Cl.
    CPC ............ *H04L 7/0331* (2013.01); *H04L 7/0016* (2013.01)
(58) Field of Classification Search
    CPC . H04L 7/0331; H04L 7/0016; H04L 27/2657; H04W 56/004
    See application file for complete search history.

(56) References Cited

U.S. PATENT DOCUMENTS

| | | | |
|---|---|---|---|
| 5,359,627 A * | 10/1994 | Resnikoff | 375/254 |
| 6,366,629 B1 * | 4/2002 | Chen | H04L 7/0029 348/21 |
| 6,765,956 B1 * | 7/2004 | Gatherer | H04L 7/042 375/222 |
| 7,054,349 B2 * | 5/2006 | Cattaneo et al. | 375/130 |
| 8,049,983 B1 * | 11/2011 | Han | G11B 20/10009 360/51 |
| 8,238,271 B2 * | 8/2012 | Seok et al. | 370/278 |
| 8,238,494 B2 * | 8/2012 | Sher et al. | 375/345 |
| 2002/0025006 A1 * | 2/2002 | Mehrnia et al. | 375/316 |
| 2003/0152022 A1 * | 8/2003 | Hosur | 370/208 |
| 2004/0196894 A1 * | 10/2004 | Akopian | 375/150 |
| 2005/0238060 A1 * | 10/2005 | Kuntz | H04J 3/0608 370/509 |
| 2006/0068714 A1 * | 3/2006 | Sharma et al. | 455/67.11 |
| 2007/0121750 A1 * | 5/2007 | Shirakata et al. | 375/267 |
| 2008/0279066 A1 * | 11/2008 | Kikukawa | G11B 20/10009 369/53.1 |
| 2009/0274250 A1 * | 11/2009 | Li | 375/344 |
| 2010/0041338 A1 * | 2/2010 | Hannagan | 455/62 |
| 2013/0051503 A1 * | 2/2013 | Ly-Gagnon et al. | 375/343 |

\* cited by examiner

*Primary Examiner* — Jean B Corrielus
(74) *Attorney, Agent, or Firm* — Workman Nydegger

(57) ABSTRACT

Detecting timing of a synchronization sequence included in a data stream transmitted in a noisy channel. The synchronization sequence is a known data sequence purposely injected into the data stream for synchronization. A data stream waveform, is obtained from a noisy communication channel. The data stream waveform includes an instance of a synchronization sequence waveform. One or more samples of the synchronization sequence waveform are obtained. One or more samples of a model synchronization sequence waveform are obtained. The model synchronization sequence waveform models an expected waveform for the synchronization sequence being transmitted on the communication channel by applying the synchronization sequence to a model of the communication channel. The instance of the synchronization sequence waveform is correlated with the model synchronization sequence waveform by correlating one or more samples of the synchronization sequence waveform with the one or more samples of the model synchronization sequence waveform.

20 Claims, 20 Drawing Sheets

SYNCHRONIZATION THROUGH WAVEFORM CORRELATION

BACKGROUND

Background and Relevant Art

Digital data communications are ubiquitous in today's modern society. Such communication can take one or more of a number of different forms. For example, communications may take place at the micro-level when binary bits are transmitted across microscopic circuits within an integrated circuit. At the other extreme, communication may travel long distances by use of satellite or other long distance transmission systems. Indeed communications are regularly undertaken with machines and individuals around the world and beyond.

To accomplish such communications requires the use of one or more transmission systems and associated mediums. Such mediums may be, for example, integrated circuit paths, wires, optical fibers, or even over the air. Virtually every communication system has some limitations associated with it. In particular, any given communication medium may attenuate digital signals transmitted across it. Additionally, the mediums may be susceptible to noise which can mask or otherwise overpower data in a digital signal. Indeed, small noise sources from molecular vibrations to large intentional jamming noise sources can drown out digital signals to make them very difficult to identify in a digital data stream. A factor, known as the signal to noise ratio (SNR) can quantify the size of a useful signal stream with respect the amount of noise on a channel in which the signal stream is being transmitted. The lower the SNR, the more the signal is buried in the noise.

To facilitate recovery of a signal on a channel, signals will often include a synchronization sequence, sometimes referred to as a synch word. In particular, signals are typically sent and received in many systems without an accompanying clock signal to identify symbol transmission rates. Rather, a known synchronization sequence can be used to estimate the clock rate and to identify symbol boundaries.

A synchronization sequence, in digital communications, is a string of known symbols that is injected into a data stream. If the synchronization sequence can be identified, it can be used for clock and data recovery (CDR) purposes. In particular, it can be used to align symbols and to determine the rate at which symbols are arriving into a data receiver. The synchronization sequences will typically be transmitted periodically in a signal stream to allow CDR functions to be performed at various times when receiving a signal stream. In many such systems, the data stream (including the synchronization sequence and other payload data) is sparse, meaning that there are long temporal gaps between bursts of data.

Traditional clock and data recovery is performed using a feedback arrangement, such as a phase locked loop (PLL). In PLL applications, an output data stream is fed back into an error detector along with an input data stream. The recovery clock phase is adjusted to align the input and output signals. However, in sparse data streams, it may be difficult to use such feedback type arrangements as there is not a constant input data stream, and such systems therefore typically have poor performance in sparse data stream environments.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a communication system. The method includes acts for detecting timing of a synchronization sequence included in a data stream transmitted in a noisy channel. The synchronization sequence is a known data sequence purposely injected into the data stream for clock and data recovery. The method includes obtaining a data stream waveform, from a noisy communication channel. The data stream waveform includes an instance of a synchronization sequence waveform. The method further includes obtaining one or more samples of the synchronization sequence waveform. The method further includes obtaining one or more samples of a model synchronization sequence waveform, wherein the model synchronization sequence waveform models an expected waveform for the synchronization sequence being transmitted on the communication channel by applying the synchronization sequence to a model of the communication channel. The method further includes correlating the instance of the synchronization sequence waveform with the model synchronization sequence waveform by correlating multiple samples of the synchronization sequence waveform with the multiple samples of the model synchronization sequence waveform.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered limiting in scope, embodiments will be described and explained with additional specificity and detail through the use of the accompanying drawings in which.

DETAILED DESCRIPTION

Embodiments described herein use a model-based correlator to detect a synchronization sequence, sometimes referred to as a unique word. In particular, embodiments may produce a model synchronization sequence waveform by passing the synchronization sequence through a noise free model of a communication channel, including modeling of various filters in the channel. The synchronization sequence is also received by the actual communication channel, which has significant noise, producing a synchronization sequence waveform. Sample points can be taken for several different alignments of the model synchronization sequence waveform. Sample points can also be taken for the synchronization sequence waveform. Note that the sample rate and the data rate of the synchronization sequence waveform may be non-commensurate resulting in some sample points that convey significant amounts of information (e.g. when a sample is taken near a peak) about the synchronization sequence waveform and some sample points that convey almost no information (e.g. when a sample is taken near a null) about the synchronization sequence waveform. However, the sample points from the different alignments of the model synchronization sequence waveform can be compared to sample points from the synchronization sequence waveform to identify a best alignment and to hopefully be able to correlate some sample points from the synchronization sequence waveform that convey significant amounts of information. Thus, sample points of incoming data can be correlated against the sample points of the different alignments to find the alignment of the model synchronization sequence waveform that most closely matches the incoming synchronization sequence waveform. Thus, rather than correlating against the binary value of the synchronization sequence, embodiments correlate against the expected waveform when the synchronization sequence is being received through a channel.

Figure 1:
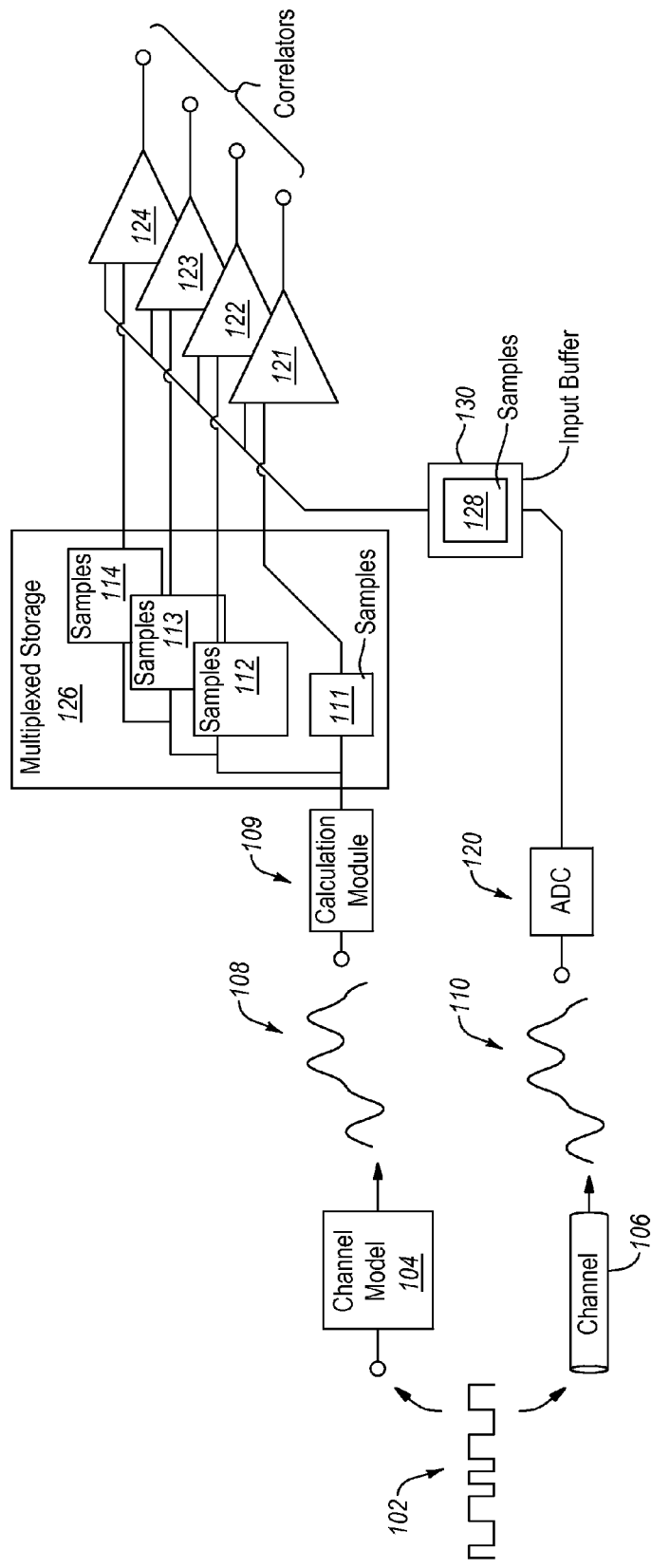
FIG. 1 illustrates correlating samples of a synchronization sequence waveform with samples of a model synchronization sequence waveform.

An example is illustrated with reference to FIG. 1. FIG. 1 illustrates a fine tuned alignment of a synchronization sequence waveform sample and will typically be done after a coarse acquisition of alignment, but is shown first here to illustrate different model comparisons which will help to facilitate understanding of both coarse acquisition and fine tracking. FIG. 1 illustrates a synchronization sequence 102. The synchronization sequence is passed through a channel model 104. The channel model 104 models a communication channel 106. The communication channel may include various hardware devices and communication media. For example, the communication channel 106 may include hardware such as various analog to digital converters, digital to analog converters, amplifiers, transmitters, filters, etc. The communication channel 106 may also include a model of one or more transmission media, such as wired or wireless networks, optical fiber, printed circuit board traces, etc. The channel model 104 attempts to model the channel 106 such that if the synchronization sequence is applied to the channel model 104, it should produce a model synchronization sequence waveform that is approximately the same as a synchronization sequence waveform produced when the synchronization sequence is transmitted through the channel 106, except that the model synchronization sequence waveform will typically not have a noise component.

FIG. 1 illustrates a model synchronization sequence waveform 108 and a synchronization sequence waveform 110. The model synchronization sequence waveform 108 is applied to a mathematic calculation module 109 for four different alignments to produce four different sets of samples. This processing can be performed off-line and prior to a data stream being sampled. Thus, pre-calculation can be performed to conserve resources during sampling of an actual data stream. While four alignments are shown in the illustrated example, it should be appreciated that in alternative embodiments, other numbers of alignments may be used. Alignments may be determined, for example, in fractions of a symbol. Thus, in the illustrated example, the alignments are ¼ of a symbol. In some embodiments, the number of alignments and the fractions may be determined based on channel 106 noise. For noisier channels, alignments should be selected to be closer together than for less noisy channels. As will be apparent in the discussion below, this allows for potentially closer correlation between model synchronization sequence waveform samples and synchronization sequence waveform samples resulting in a stronger correlation being achieved to be able to overcome the noise in the channel. However, while this may be helpful to a point, there is a point where closer sampling will not improve performance. Rather, performance may be improved by lengthening the synchronization sequence.

In the example illustrated in FIG. 1, the first set of samples 111 at a first alignment 211 (see FIG. 2B), the second set of samples 112 at the second alignment 212, the third set of samples 113 at the third alignment 213 and the fourth set of samples 114 at the fourth alignment 214 can be calculated by a module 109. The samples may be stored in a multiplexed storage 126, such as a RAM that allows different sets of samples to be output for correlation.

The synchronization sequence waveform 110 is also sampled by an ADC 120 and samples 128 from the synchronization sequence waveform 110 are stored in an input buffer 130. In the example illustrated in FIG. 1, four comparisons are done to compare the samples 128 from the synchronization sequence waveform 110 to the samples 111 through 114 of the four different alignments of the model synchronization sequence waveform 108 to attempt to determine which alignment most closely models the synchronization sequence waveform 110. As illustrated in FIG. 1, a first correlator 121 has as inputs samples 128 of the synchronization sequence waveform 110 and samples 111 of a first alignment of the model synchronization sequence waveform 108. A second correlator 122 has as inputs the samples 128 of the synchronization sequence waveform 110 and samples 112 for the second alignment of the model synchronization sequence waveform 108. A third correlator 123 has as inputs samples 128 of the synchronization sequence waveform 110 and samples 113 for the third alignment of the model synchronization sequence waveform 108. A fourth correlator 124 has as inputs samples 128 of the synchronization sequence waveform 110 and samples 114 for a fourth alignment of the model synchronization sequence waveform 108. However, as will be illustrated in detail below, in other embodiments, different instances of the synchronization sequence waveform 110 may be correlated to different alignments of the model synchronization sequence waveform 108 when attempting to acquire tracking of a data stream. Notably, while four correlators are illustrated, a single correlator may be used to accomplish the comparison functionality by time division multiplexing the correlator for the different comparisons. Samples could be multiplexed into the single correlator from the multiplexed storage 126.

The correlators, in some embodiments, function by multiplying corresponding sample points. Thus, for example, sample points from the model synchronization sequence waveform are multiplied by corresponding sample points from the synchronization sequence waveform and the different multiplications are added to arrive at a correlation output. This multiplication and addition will cause samples that are highly correlated to produce a large correlation output while less highly correlated samples will produce a smaller correlation output. Another correlator that could be used for embodiments of the invention is a simple difference function. In other embodiments, correlators may flip signs (e.g. by multiplying by +/−1) before summing soft values or even hard values (0/1, or +/−1 s).

Figure 2A:
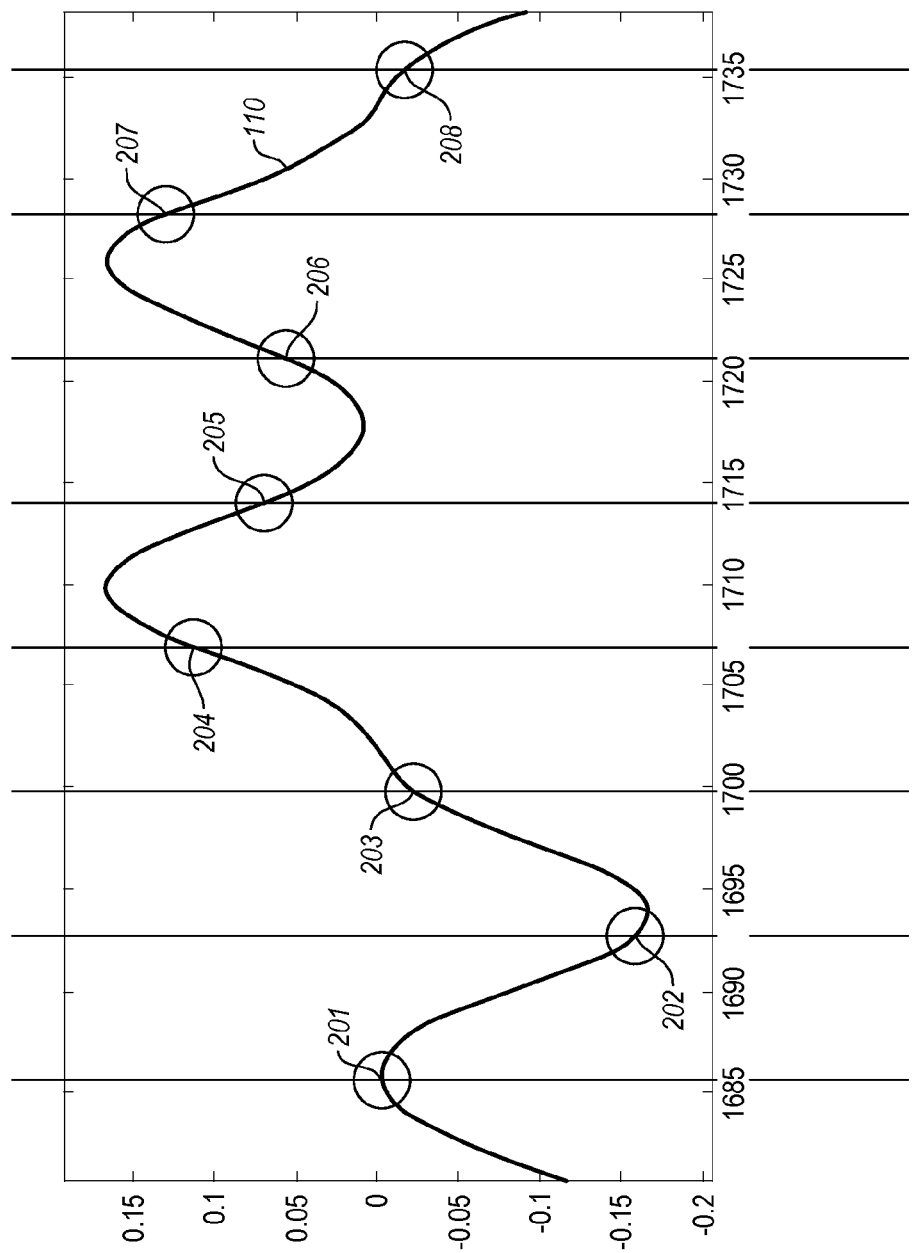
FIG. 2A illustrates an example synchronization sequence waveform and sample points.
Figure 2B:
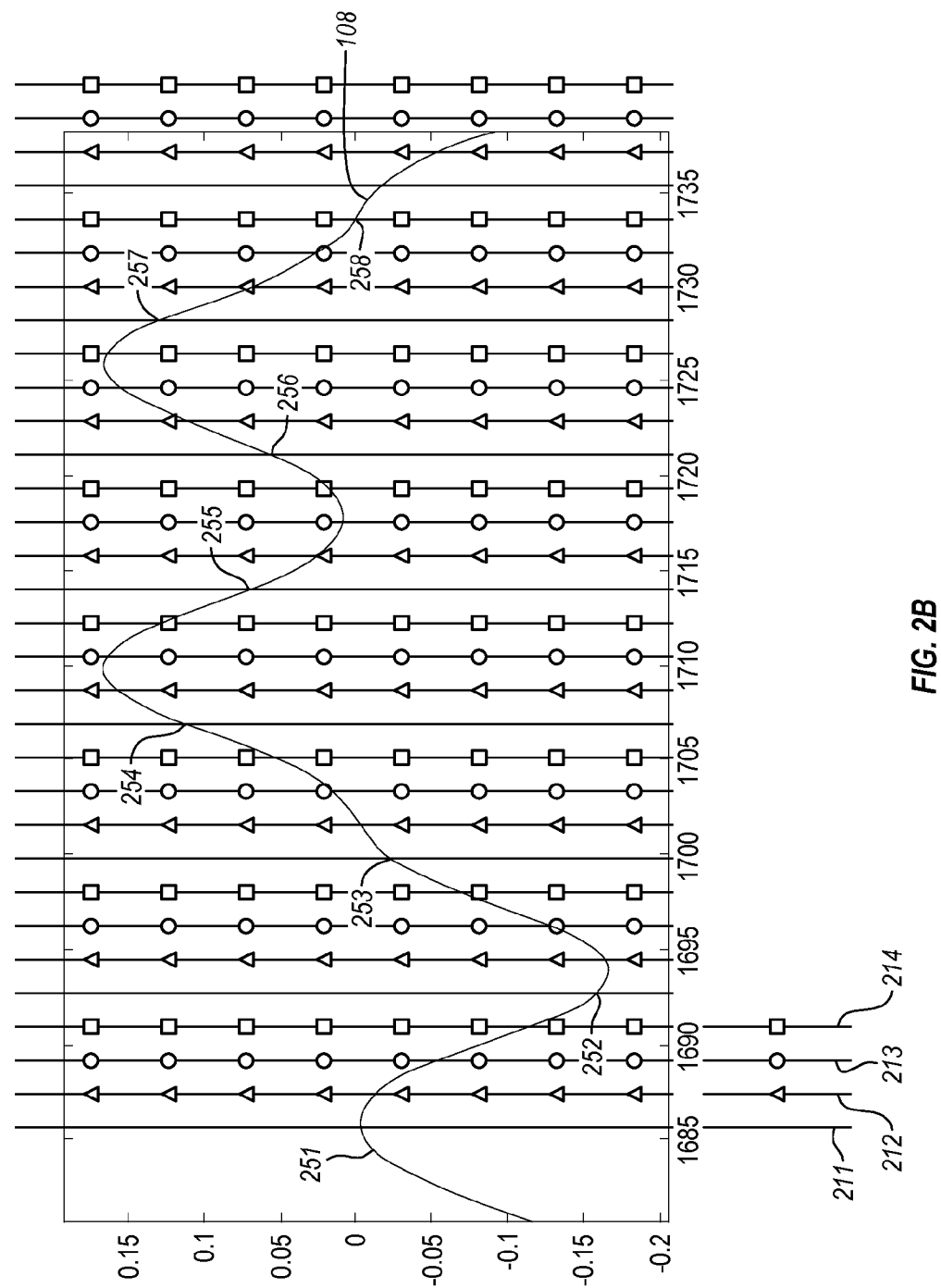
FIG. 2B illustrates various alignments for a model synchronization sequence waveform.

Referring now to FIGS. 2A and 2B, waveforms are illustrated showing the correlation. FIG. 2A illustrates the synchronization sequence waveform 110. In this example, the synchronization sequence waveform 110 is a RZ-DPSK waveform. FIG. 2A also illustrates a plurality of sample points 201, 202, 203, 204, 205, 206, 207, and 208. These may be the sample points identified by the ADC 120.

FIG. 2B illustrates the model synchronization sequence waveform 108. FIG. 2B also illustrates four alignments 211, 212, 213 and 214 of the model synchronization sequence waveform 108. Sample points are taken for each alignment where they are illustrated intersecting the model synchronization sequence waveform 108. The sample points of each alignment of the model synchronization sequence waveform 108 can be compared to the sample points 201 through 208 of the synchronization sequence waveform 110 to determine which alignment most closely matches the sample points 201 through 208 of the synchronization sequence waveform 110. In the illustrated example, the sample points of the first alignment 211 most closely (although not exactly) match the sample points 201 through 208. Thus, this alignment 211 can be used for data recovery of a stream of data that uses the synchronization sequence 102.

Illustrating now the correlation function, the value of sample 201 is multiplied by the value of sample 251, the value of sample 202 is multiplied by the value of sample 252, the value of sample 203 is multiplied by the value of sample 253, the value of sample 204 is multiplied by the value of sample 254, the value of sample 205 is multiplied by the value of sample 255, the value of sample 206 is multiplied by the value of sample 256, the value of sample 207 is multiplied by the value of sample 257, and the value of sample 208 is multiplied by the value of sample 258. The result of all of these correlation multiplications are added up to arrive at the correlation output. Similar correlation calculations can be done for the other alignments 212, 213, and 214. However, the first alignment 211 will produce the greatest output.

Figure 3:
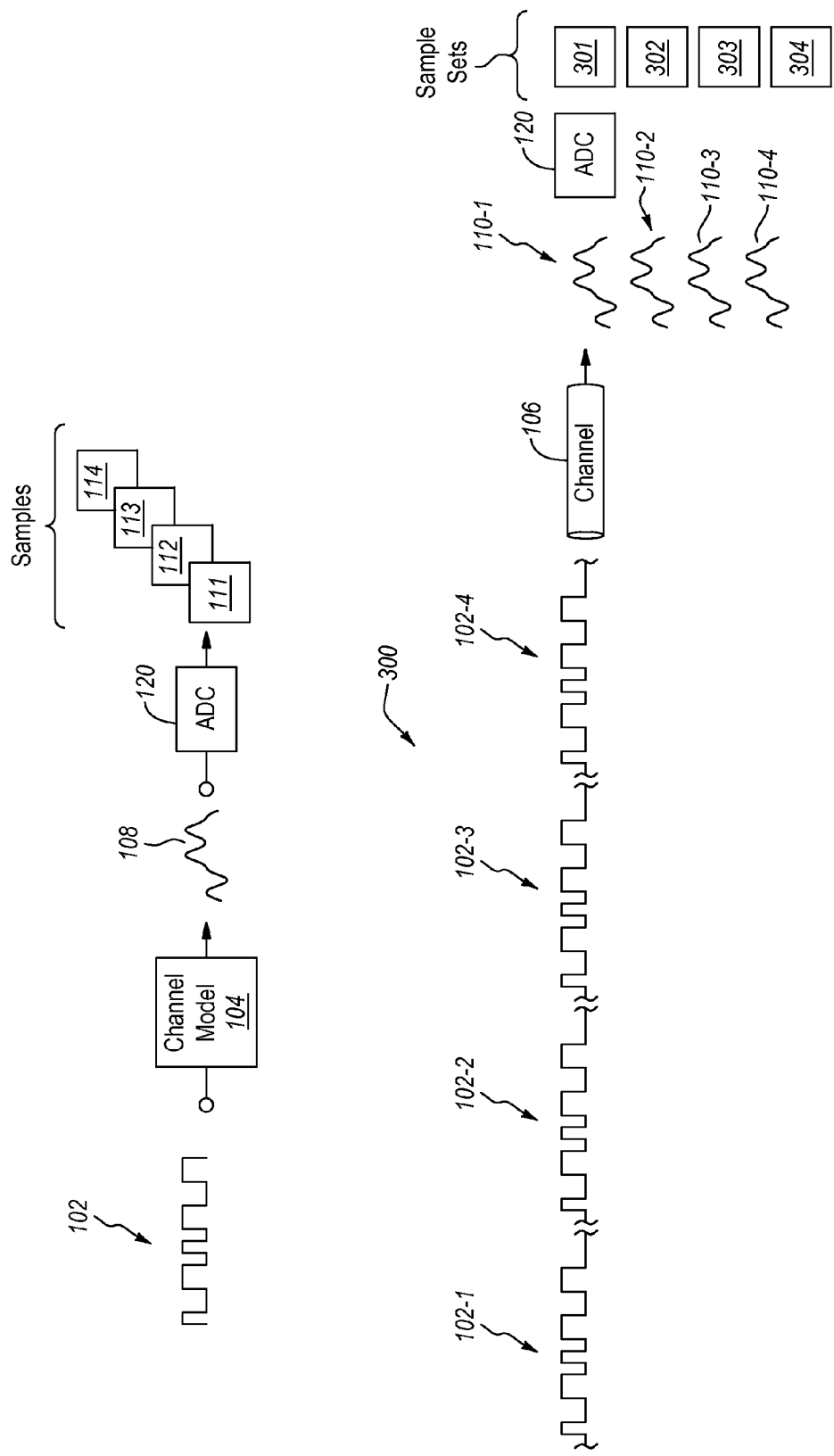
FIG. 3 illustrates a synchronization sequence, a channel model, a model synchronization sequence waveform, a channel, several synchronization sequence waveforms and samples of the model synchronization sequence waveform and synchronization sequence waveform.

FIG. 3 illustrates an example where different instances of a synchronization sequence in a data stream produce different synchronization sequence waveforms and may be compared to an alignment or different alignments of the model synchronization sequence waveform. This may be useful when attempting to acquire a data stream, as there may not be sufficient time to perform multiple comparisons on a single instance of a synchronization sequence waveform due to the speed at which communication is taking place. However, it may be assumed that it is roughly known at what rate the different instances of the synchronization sequence are being transmitted. However, the data rate of the data stream and the sample rate for sampling the data stream will be non-commensurate. This will result in the samples of the different instances of the synchronization sequence waveform shifting over time, and eventually the samples will shift into a position that is detectable according to some determined threshold by a correlator.

FIG. 3 illustrates a data stream 300. The data stream 300 is a sparse data stream, meaning that there are long temporal gaps between bursts of data. The data stream 300 periodically includes instances 102-1, 102-2 102-3, and 102-4 of the synchronization sequence 102 for synchronization. Further, while the instances are shown as bursts in a single portion of the data stream 300, it should be appreciated that in other embodiments, the instances may be distributed, meaning that different portions of an instance of the synchronization sequence may be distributed along the data stream 300 and may be interspersed with other payload data in the data stream. Further, it should be appreciated that while not shown, the data stream 300 will also include payload data which can be recovered once timing (including data locations and clock information) of the data stream 300 is identified.

In the example illustrated, four instances 102-1, 102-2, 102-3 and 102-4 of the synchronization sequence 102 are shown in the data stream 300. The data stream 300 passes through the communication channel 106 producing, over time, four instances 110-1, 110-2, 110-3 and 110-4 of the synchronization sequence waveform 110. These four instances 110-1, 110-2, 110-3, and 110-4 of the synchronization sequence waveform 110, over time, are sampled to produce four sets 301, 302, 303 and 304 of samples. Each of these sets of samples can be compared to one (for a single alignment) or more (for multiple alignments) sets of samples for the model synchronization sequence waveform 108. Thus, for example, sample set 301 could be compared with sample set 111. Sample set 302 could subsequently be compared with sample set 111. Sample set 303 could subsequently be compared with sample set 111 and sample set 304 could subsequently be compared with sample set 111. Additional sample sets for different instances of the synchronization sequence waveform 102 may be compared until the location of the synchronization sequence 102 is located in a data stream 300. Notably, sample sets 301, 302, 303, and 304 should be approximately the same with some variance due to clock frequency mismatch between a transmitter in the channel 106 and a receiver in the channel 106. I.e. the sample rate and data rate will be slightly (or potentially drastically) non-commensurate.

The comparisons as illustrated in FIG. 3 may be performed in a coarse search probe to attempt to identify the location of synchronization sequence instances in a data stream, or in other words, to achieve symbol alignment. However, this will not necessarily produce the best alignment, but simply one that can be detected. Once a comparison produces a sufficiently high correlation to indicate that the location of the synchronization sequence 102 in the data stream 300, a data capture operation can be performed to capture data from the data stream on the next instance of the synchronization sequence 102. Then, comparisons can be performed on the captured data against different alignments to perform a fine grained search to perform clock and data recovery to achieve sequence alignment. For example, in the fine search, a determination can be made regarding a number of alignment shifts from the alignment identified in the coarse search to identify proper alignment and symbol rate. Thus, for example, samples 301 could be correlated with samples 111, 112 113 and 114 to determine a more fine grained alignment. FIG. 1 illustrates an example where samples 128 are correlated with four different model alignments 111, 112, 113 and 114 to perform a fine grained alignment.

In some embodiments, coarse correlations may be made on a periodic rate. For example, in some embodiments, a correlation is performed every 32 samples in that correlation is performed only every $32^{nd}$ sample of the synchronization sequence waveform to a given set of samples for a given alignment of the model synchronization sequence waveform. However, in other embodiments, a different appropriate sample frequency may be selected. The sample frequency may be selected such that samples will be taken at some time on the synchronization sequence waveform at a point sufficiently close to samples from the model synchronization sequence waveform to reach some threshold correlation to indicate acquisition of the synchronization sequence 102. Thus, in the example above, if the sample points on the model synchronization sequence waveform 108 are within 32 sample points of the sample points of the synchronization sequence waveform 110, the correlation will signal an acquisition.

Note that due to the data rate of the data stream and the sample rate being non-commensurate, an instance of the synchronization sequence waveform eventually slides into sufficient alignment with a set of samples from an alignment of the model synchronization sequence waveform. However, a number of different instances of the synchronization sequence may need to be received before an instance of the synchronization sequence slides into sufficient alignment with a set of samples from an alignment of the model synchronization sequence waveform to be acquired, which may take a significant amount of time to acquire the data stream.

Acquisition can be accelerated in a number of different ways. One way that acquisition can be accelerated is by using additional correlators. For example, using two correlators correlating different sets of samples, acquisition time can be cut in approximately half. Thus for example, one correlator may begin correlating samples at a $1^{st}$ sample, while the second correlator begins correlating at a $16^{th}$ sample offset from the $1^{st}$ sample. Keep in mind that the correlator hardware may not be fast enough, given the data rate of the data stream to perform these two correlations with a single correlator. Thus, two correlators are used with a 16 bit offset from each other (in the 32 bit sample frequency described above).

In some embodiments, if a sufficient number of correlators are used, embodiments may be implemented where alignment can be accomplished in a single instance of the synchronization sequence waveform 110. In this case, there would be no need to know the time separation between synchronization sequences. This may be useful in embodiments where data arrives at an arbitrary time, such as a randomly timed packet communication. One such example is Ethernet communications. Another example may be free space optical communications. Yet another example may be satellite communications, including GPS satellite communications. While a number of examples have been illustrated here, these are only for examples, and it should be appreciated that a virtually limitless number of different communication schemes may make use of the principles illustrated herein.

A second way to speed up acquisition is to perform sample jumps. For example, if the data rate of the data stream and the sample rate are very close, an instance of the synchronization sequence waveform 110 may take a long time to slide into a detectable correlation in a coarse acquisition. Some embodiments, may force sliding by jumping samples. Thus, for example, a first correlation may be done. 32 samples later a second correlation may be done. 32+8 samples later, a third correlation may be done. 32+8 samples after this, a fourth correlation may be done. This forces a shift in the alignment between samples. Various algorithms could be implemented to force an optimal sliding pattern. Thus, for example, jumps could be constant, or variable.

The fine and coarse correlations in FIGS. 1 and 3 share many common characteristics. As such, embodiments may conserve hardware by reusing hardware components, and in particular correlators, that are capable of performing both the coarse grained search illustrated in FIG. 3, and the fine grained search illustrated in FIG. 1.

Figure 4:
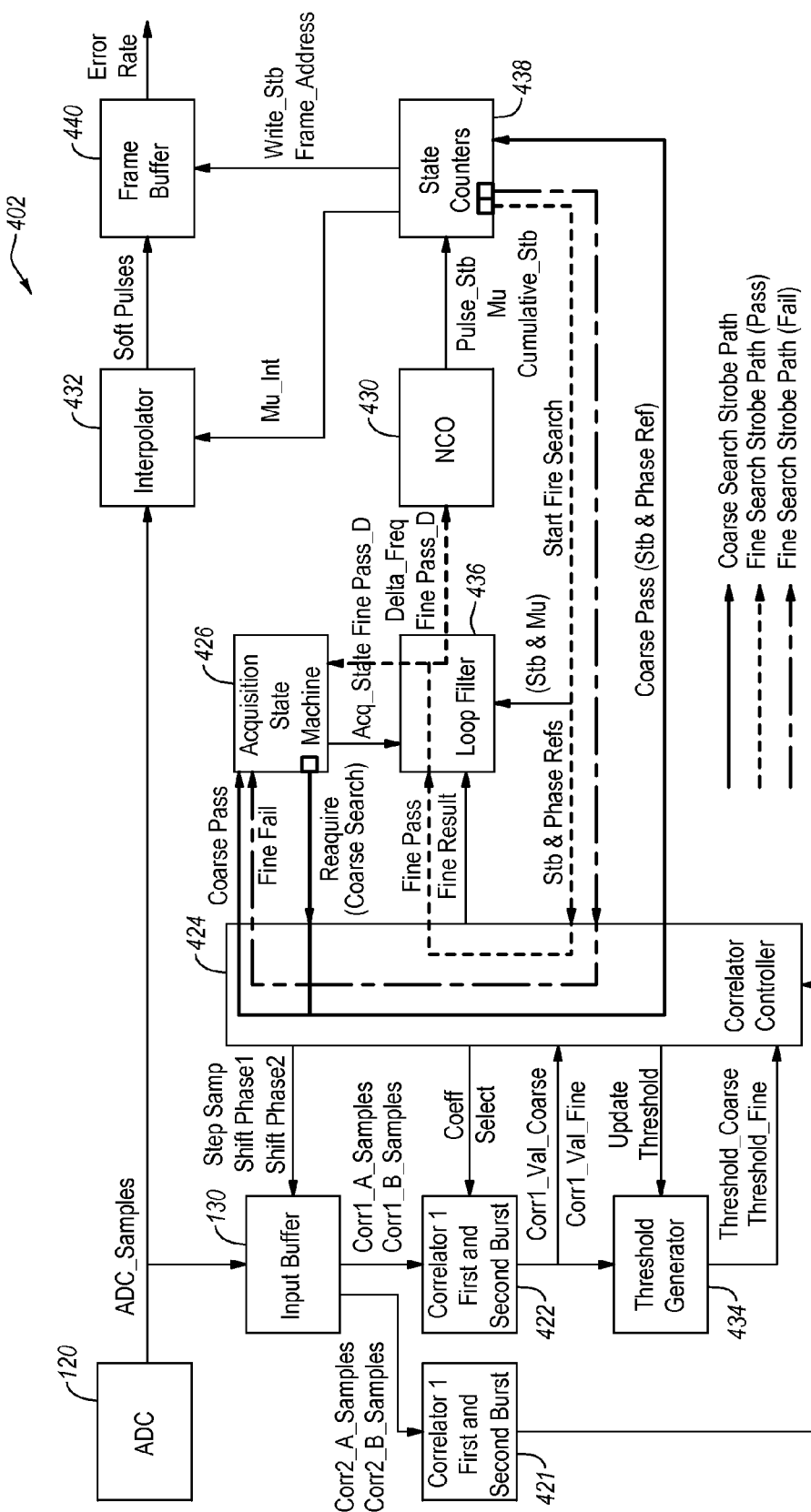
FIG. 4 illustrates a communication system for correlating samples of waveforms.

FIG. 4 now illustrates a block diagram of a system 402. The system 402 includes components that can be used to perform coarse grained acquisition as described above, along with fine grained tracking, also described above but where resources can be shared (such as correlators) between the two function.

FIG. 4 will be discussed generally and then later, more detailed descriptions of the components illustrated in FIG. 4 will be explained. FIG. 4 illustrates the ADC 120. The ADC 120 receives as input the synchronization sequence waveform 110. Samples of the synchronization sequence waveform 110 from the ADC 120 are provided to an input buffer 130.

Samples from the input buffer 130 are provided to one or more correlators 421 and 422. For example, the samples 128 may be provided to the correlators 421 and 422. In this example, while two correlators are shown, it should be appreciated that a single correlator may be used, or additional multiple correlators may be used depending on various design choices. In this example, two correlators 421 and 422 are used to speed up acquisition time. In particular, the correlator 421 is only used during the coarse search along with the correlator 422 which is used during both the coarse acquisition search and the fine search. By using both correlators 421 and 422, acquisition time can be reduced. In alternative embodiments, in a fine search, additional multiple correlators may be used to correlate multiple offsets of the model synchronization sequence waveform 108 to the synchronization sequence waveform 110 simultaneously.

Multiple instances of the synchronization sequence waveform 110 (such as synchronization sequence waveform 110-1, 110-2, 110-3, 110-4) may be captured and stored simultaneously in the input buffer 130. This may occur when the data rate is much faster than the rate at which the data can be processed in real time by a single correlator or single set of correlators 421 and 422. Instead, the samples (e.g. samples 301, 302, 303 and 304) can be captured, and different sets of samples can be compared in overlapping time frames to the same set of samples (e.g. samples 111) of the model synchronization sequence waveform 108 using different correlators (i.e. additional correlators in addition to those correlators 421 and 422 shown). This allows the system 402 to process incoming data in near real time by using different hardware as each instance of the synchronization sequence waveform arrives at a receiver and is sampled by the ADC.

However, in the present example, embodiments may still be able to process instances of the synchronization sequence waveform 110 in the data stream that arrives faster than the correlators 421 and 422 can process it by storing different instances of samples and time division multiplexing one or more of the correlators 421 and 422 to process the different instances of samples. This might be possible in some embodiments when there are short bursts of data followed by long periods where no data is received. Alternatively, data could be captured and the system could then perform the processing on the data offline. This will be explained in more detail below in conjunction with the description of fine grained searching.

FIG. 4 illustrates that the correlator 422 includes a Coeff_Select input. This input selects a set of model synchronization sequence waveform 108 samples that are stored at the correlator 422, and thus selects an alignment for correlation. For example, the sets of samples 111, 112, 113, and 114 of FIG. 1 could be stored in a multiplexable storage 126 at the correlator 422. The correlator controller 424 could select one of the sets of samples 111, 112, 113, or 114 to compare with the samples 128. The selection, in some embodiments could be based on what the system is trying to accomplish. For example, in some embodiments, the system may be attempting to perform a coarse grained search to identify symbol alignment. In this case, a single alignment may be used for all synchronization sequence waveform sample instances to try to acquire lock on the synchronization sequence 102 in a data stream 300 as the samples instances of the synchronization sequence waveform 110 shift into a detectable range for acquisition by correlation to the selected model synchronization sequence waveform samples. The sample instances of the synchronization sequence waveform are not stored for a significant period of time, but rather are simply allowed to shift through the input buffer 130.

Alternatively, the system 402 may be used to perform a fine grained search to identify data. In this case, samples of the synchronization sequence waveform 110 may be stored and various alignments sequentially selected using Coeff_Select input to compare different alignment samples to the same synchronization sequence waveform 110 samples to attempt a fine tuning for clock and data recovery.

As noted previously, the particular system 402 illustrated is configured to perform both coarse grained searches for acquisition and fine grained searches for data extraction. The particular example illustrated in FIG. 4 accomplishes this using an acquisition state machine 426 which controls the correlators and receives as input from the correlators correlation values (e.g. Corr1_Val_Coarse and Corr2_Val_Coarse) and threshold values (e.g. Threshold_Coarse and Threshold_Fine) from a threshold generator 434.

Figure 5:
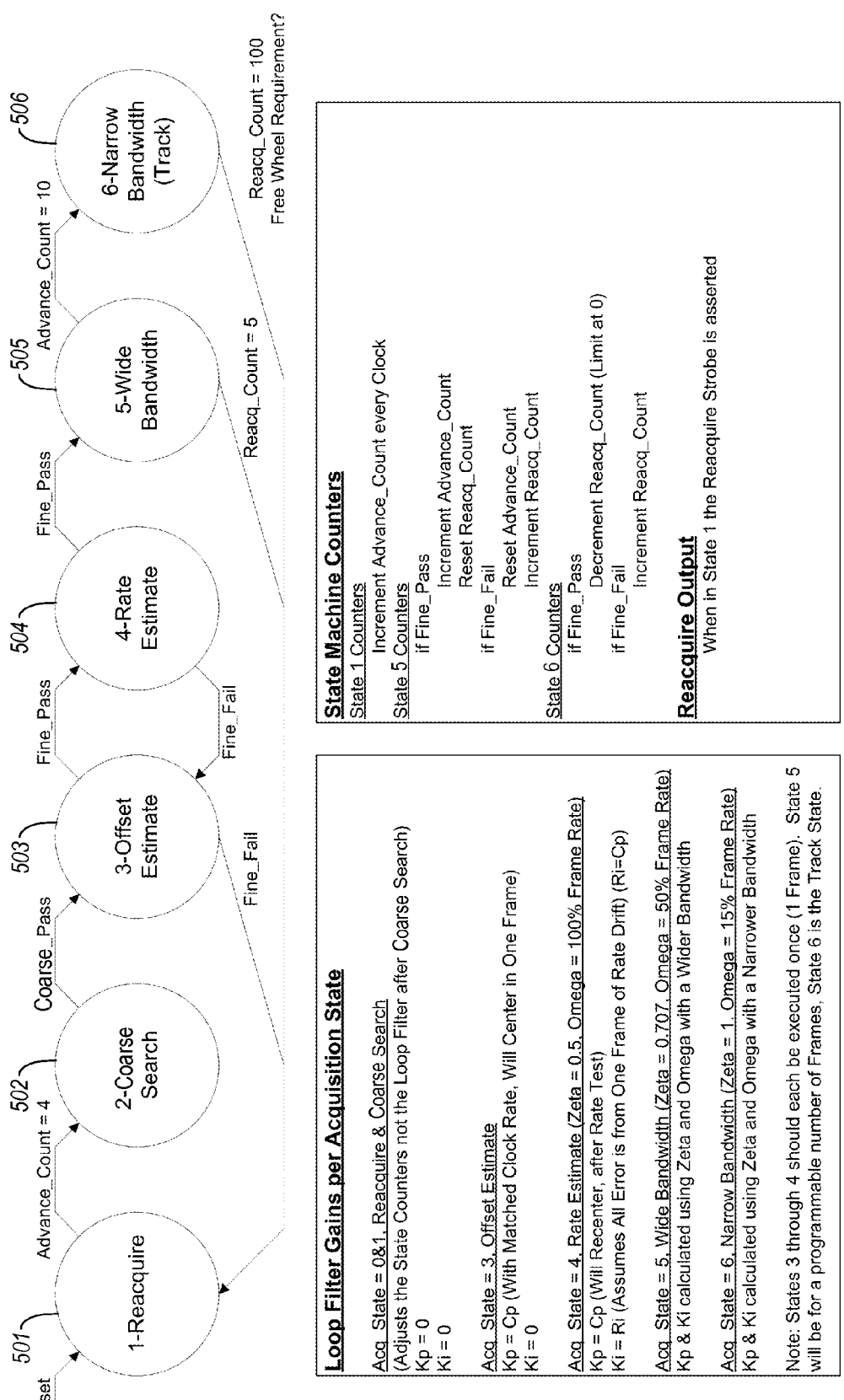
FIG. 5 illustrates an acquisition state machine.

Additional details regarding the acquisition state machine 426 are illustrated in FIG. 5. FIG. 5 illustrates the state machine 426 having six states 501, 502, 503, 504, 505 and 506. The second state is a coarse search state 502. The coarse search state attempts to identify the beginning of a synchronization sequence 102 in a data stream 300 received from a communication channel 106. In some embodiments, the approximate frequency (i.e. pulse separation between instances) of the synchronization sequence is known. The coarse search state 502 will attempt to locate the synchronization sequence 102 by sampling the data stream to obtain samples which are then correlated to one of the alignment samples of the model synchronization sequence waveform. However, the data rate of the data stream and the sample rate may be non-commensurate. When this is true, embodiments could simply continuously sample the data stream 300 to attempt to identify the synchronization sequence 102. Sample points would eventually slide into a correlation frame with sample points from an alignment of the model synchronization sequence waveform 108. I.e. sample points from the synchronization sequence waveform 110 would be sufficiently "close" to sample points of the model synchronization sequence waveform 108 to trigger an acquisition threshold at the threshold generator 426. However, if the data stream and the sample rate are close, it may require a large number of instances of the synchronization sequence 102 in the data stream before this occurred. Thus, in the coarse search, this may be accelerated by using multiple correlators or by sampling using sample jumps as described above. In the example illustrated herein, a correlation may be performed every 32 samples based on other design characteristics of the system 402 as will become apparent in the description of the input buffer 130.

Returning now to FIG. 5, additional details of the acquisition state machine 426 are illustrated. After a coarse search is successful, the acquisition state machine 426 moves to an offset estimate state 503. Actions are performed in this state 503 to attempt a more fine grained analysis to determine an offset of the synchronization sequence waveform 110. In particular, once the coarse search has identified a rough position of the synchronization sequence 102 in the data stream 300, on a next expected instance of the synchronization sequence 102 in the data stream, the synchronization sequence waveform 110 can be sampled to acquire samples from the synchronization sequence waveform 110. These can be stored and an attempt to identify an offset from an expected starting point of the instance of the synchronization sequence 102 to an actual starting point of the instance of the synchronization sequence 102 can be made. This can be done by comparing a single set of samples from the synchronization sequence waveform 110 with different alignment samples of the model synchronization sequence waveform 108. Thus, for example, the samples 128 may be compared with the samples 111, 112, 113, and 114 to attempt to identify an offset to be able to correct for the offset when attempting to recover data from the data stream 300. In the particular example illustrated, the system will attempt to compensate for the full error offset within one instance of the synchronization sequence waveform 110.

Similarly the state machine 426 includes a rate estimate state 504. The rate estimate state 504 is used to attempt to synchronize the sample rate with the data rate of the data stream 300. If the offset estimate is successful in state 503, this can be accomplished by correlating samples from the next instance of the synchronization sequence 102 that occurs after the instance used by the offset estimate state 503 with the alignment samples of the model synchronization sequence waveform 108. Any offset here is attributed to rate differences and is used to adjust the sample rate.

Figure 6:
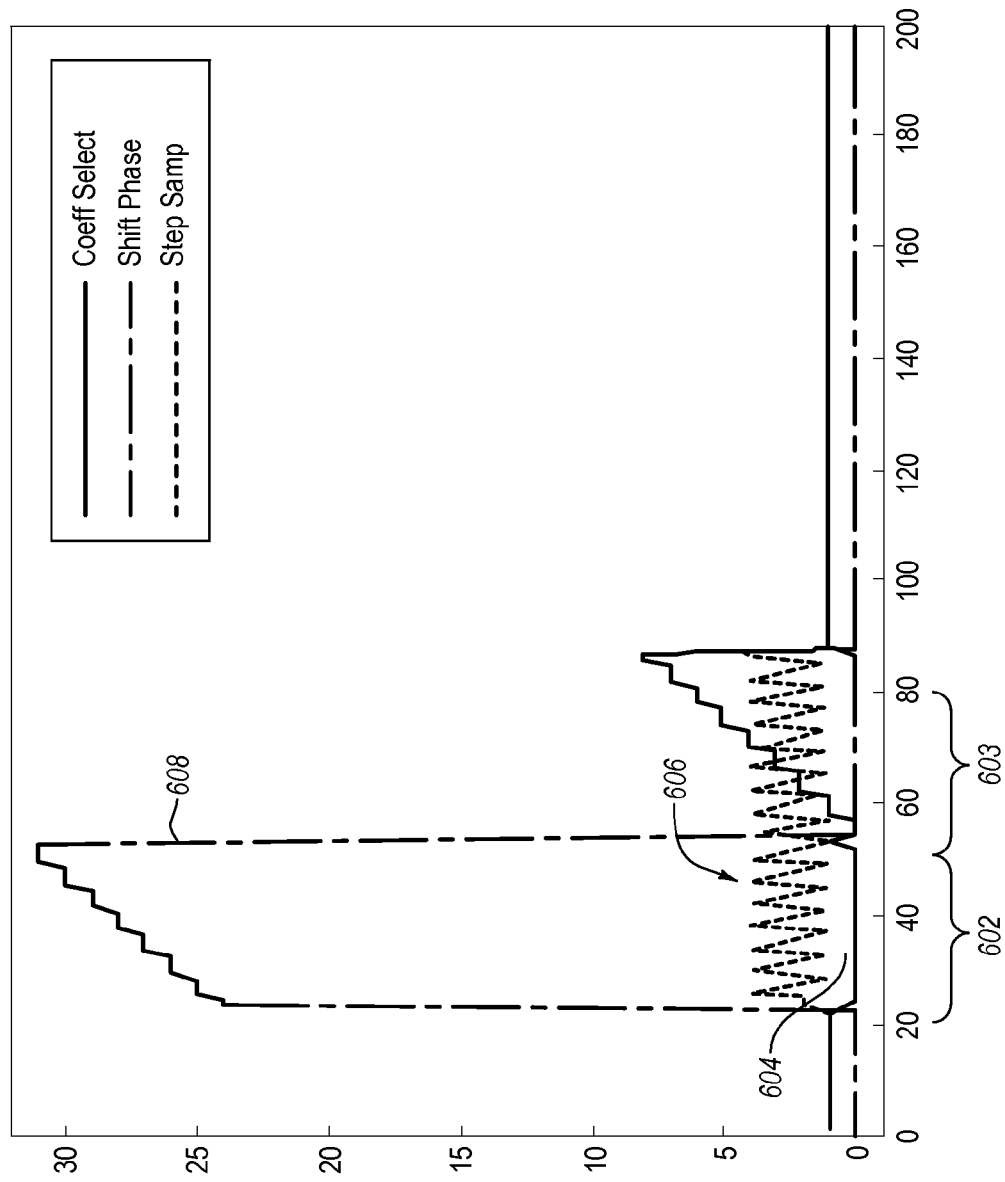
FIG. 6 illustrates timing of signals for offset and rate estimates.

The control signals used by states 503 and 504 are illustrated in FIG. 6. In particular, FIG. 6 illustrates at 602 control signals used by the offset estimate state 503 to estimate an offset. As illustrated at 602, a step sample signal 604 (illustrated as Step_Samp in FIG. 4) causes a set of synchronization sequence waveform samples to be captured into the input buffer 130. In this example, samples are captured 32 samples at a time but a total of 832 samples are captured to capture the first burst of the synchronization sequence. The samples are captured so that offline processing can be performed at a later time due to the data rate being faster than the capabilities of the system 402 to process the data. Different samples can be cycled through by using the shift phase signal 608 as will be illustrated in more detail in FIG. 7. Also as illustrated at 602, a coefficient select signal 606 (illustrated as Coeff_Select in FIG. 4) clocks through the various sets of samples for the different alignments of the model synchronization sequence waveform 108 in the correlator 422. Thus, in this example, the eight sawtooth wave pulses in the coefficient select signal 606 illustrated at 602 cycle through eight different alignments. The shift phase signal cycles through different samples from the captured samples. If a successful correlation with a sufficiently high threshold is obtained, this can be used to determine an approximate, but very close, offset.

Once this offset is obtained the step sample signal 604 is cycled causing additional samples from the data stream 300 to be captured into the input buffer 130. The eight sawtooth wave pulses of the coefficient select signal 606 illustrated at 603 cause cycling through the different samples for the different alignments of the model synchronization sequence waveform 108 to correlate these samples with the samples the synchronization sequence waveform 110. Any offset here is attributed to rate differences and can be used to adjust sample rate.

The offset information and data rate information can be used in a feed-forward fashion to control a numerically controlled oscillator 430 to adjust the sample rate so as to be able to read payload data in the data stream 300.

Figure 7:
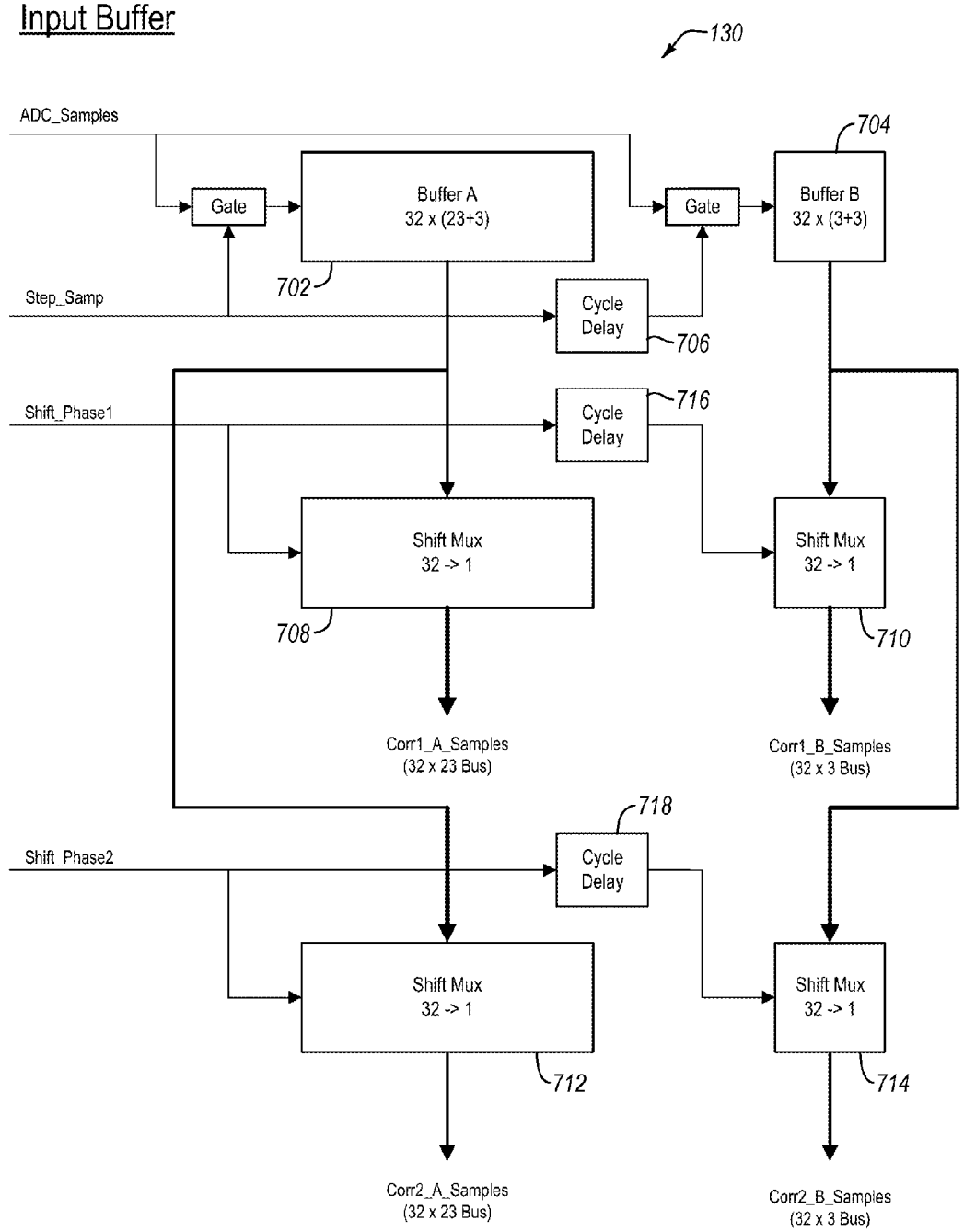
FIG. 7 illustrates an input buffer.

Additional details are now illustrated regarding the input buffer 130. Some of these additional details are illustrated in FIG. 7. The system 402 may be implemented in hardware or software that is not capable of processing all data from the data stream 300 in real time. For example, the data stream may have a data rate of 10 Gb/s. In contrast the system 402 may be implemented using a FPGA that is only capable of operating at 250 MHz, 40× difference. If a sufficient number of correlators were used, then the system could process the data in real time. However, correlators may be expensive and thus there may be a desire to limit the number of correlators used. As such, embodiments may be implemented where a stream of samples for the data stream 300 are captured and the correlators can be time division multiplexed to perform the correlations. In the coarse search, samples will be passed through the buffer but will not be stored. In the fine search, samples are stored in the input buffer 130. In the example illustrated, 32 parallel samples are taken of the data stream at a time. These 32 samples should encompass about 16 symbols of the synchronization sequence waveform 110 if sampled at about the Nyquist frequency.

Figure 8:
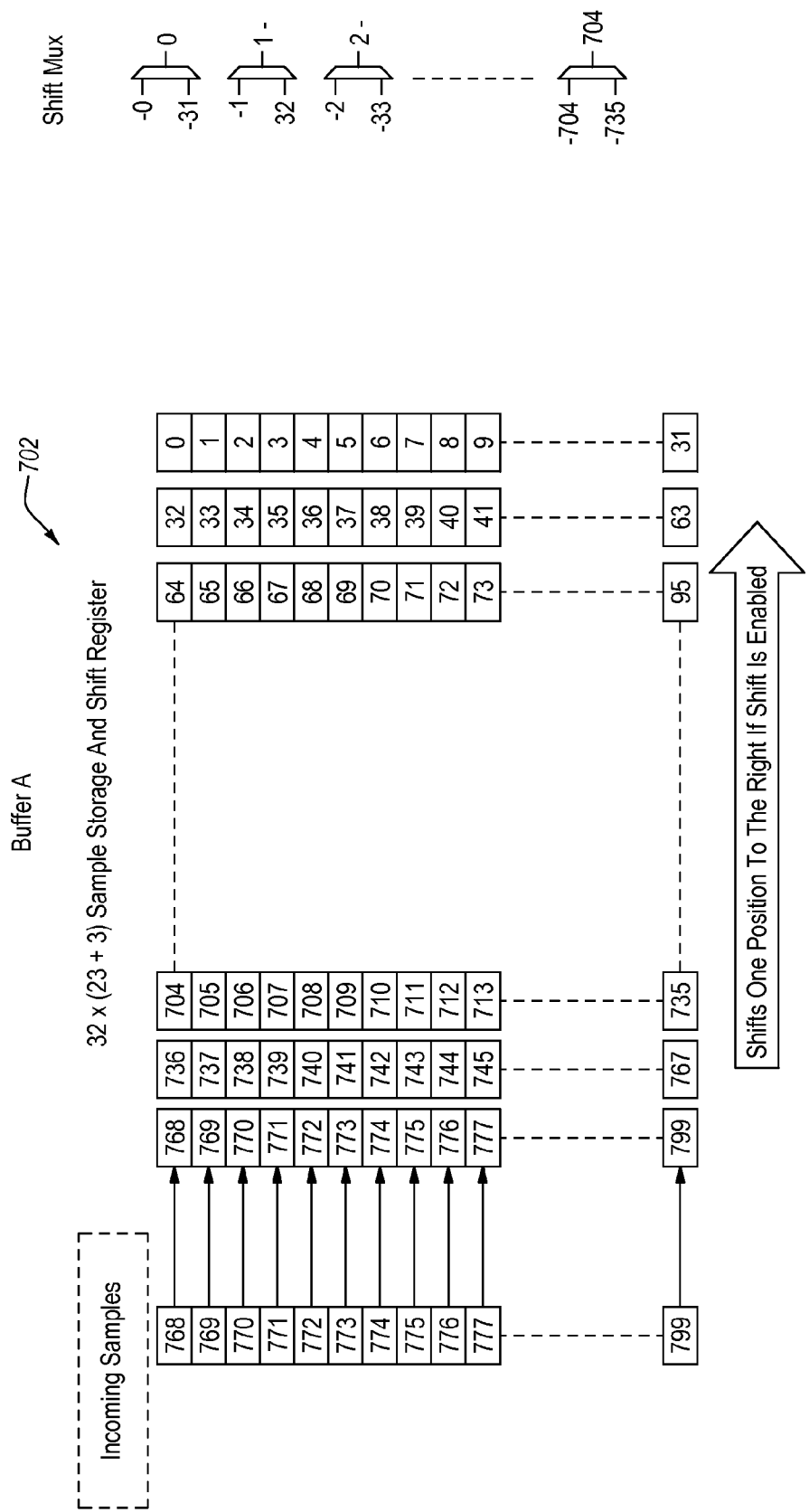
FIG. 8 illustrates a sub-block of the input buffer in FIG. 7.

Additionally, the input buffer 130 is used in a system where the synchronization sequence 102 is distributed in two different bursts of data in the data stream 300. Thus, in the illustrated example illustrated in FIG. 7, the input buffer 130 includes a first buffer 702 and a second buffer 704. The input buffer 130 further includes a delay element 706. When the input buffer 130 receives a Step_Samp data signal, samples from the first burst will be captured from the ADC 120 into the first buffer 702 and at a later time as determined by the delay element (in this example, 510 clock cycles later), samples from the second burst will be captured from the ADC 120 into the second buffer 704. In the illustrated example, 32 samples at a time can be captured in the buffers 702 and 704. An example of the buffer 702, which is a sub-block of the input buffer of FIG. 7, is illustrated in FIG. 8. FIG. 8 illustrates a buffer with (23+3) sets of 32.

FIG. 7 further illustrates several shift muxes 708, 710, 712 and 714. These can be used to shift the various samples into the correlators (in this example, the correlator 421) where they can be correlated with the alignment samples of the model synchronization sequence waveform 108. Using the shift muxes along with the buffers, multiple samples can be captured and then processed offline rather than in real time as data streams into the system. Note that delays 716 and 718 are also included in the input buffer 130 and coupled to the Shift_Phase1 and Shift_Phase2 signals respectively. This is to cause different portions of the samples to be made available to the correlator at the appropriate time for correlation.

Figure 9:
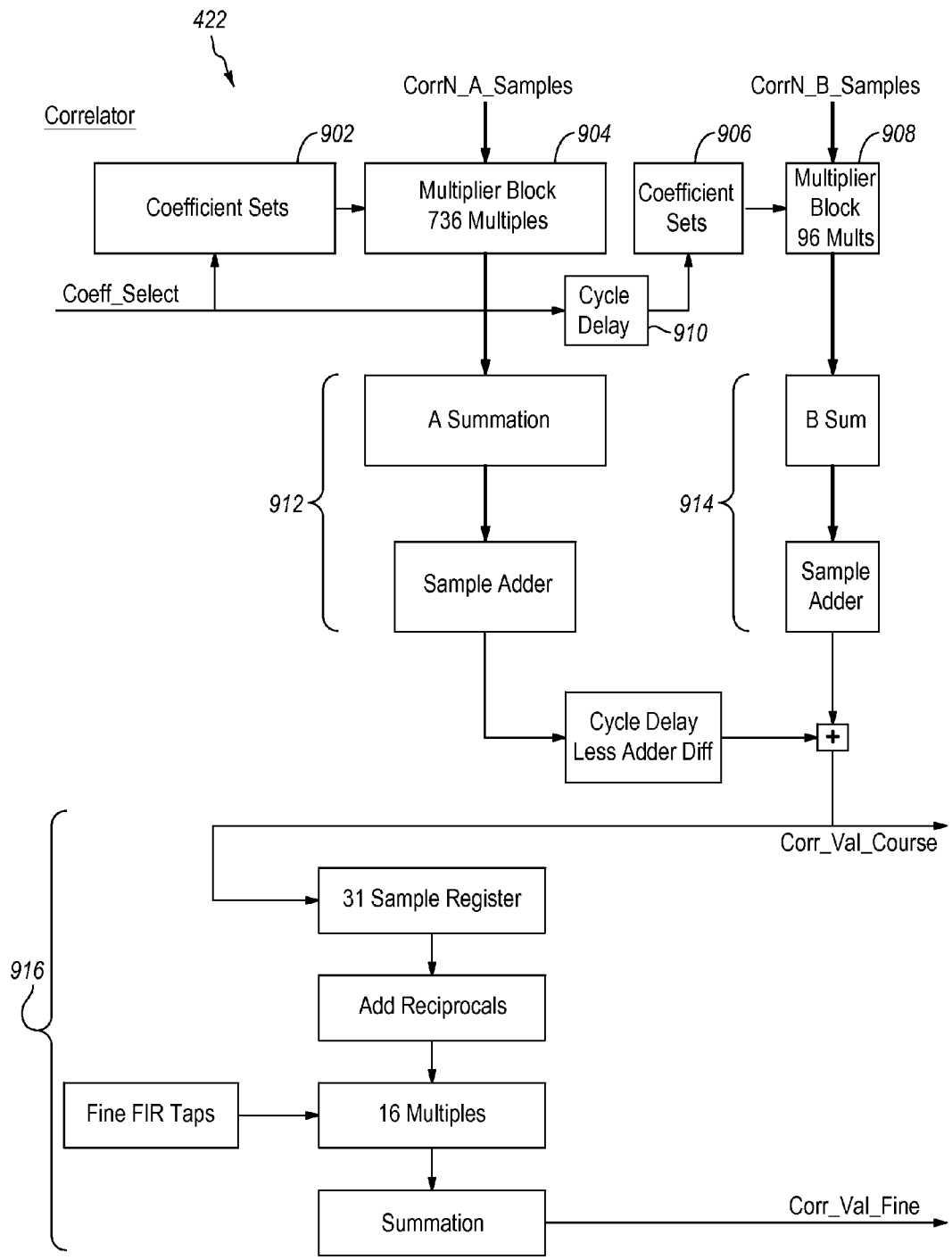
FIG. 9 illustrates a correlator.

Referring now to FIG. 9, an example of a correlator is illustrated. The example shown in FIG. 9 is of the correlator 422. The correlator 422 includes stored coefficients 902 for the first burst portion of the model synchronization sequence waveform, a multiplier 904 for the first burst of the synchronization sequence waveform, stored coefficients 906 for the second burst portion of the model synchronization sequence waveform and a multiplier 908 for the second burst of the synchronization sequence waveform. The coefficients 902 and 904 are the samples for the different alignments of the model synchronization sequence waveform 108. Different alignments of the model synchronization sequence waveform can be selected using the Coeff_Select signal. The multipliers 904 and 908 receive as input, a selected set of model synchronization sequence waveform coefficients and samples from the input buffer 130. The multipliers 904 and 908 multiply corresponding model synchronization sequence waveform and synchronization sequence waveform samples. A cycle delay 910 (which is a delay between the first burst and second burst) is included so that the appropriate model synchronization sequence waveform samples are used for the second burst of the synchronization sequence waveform. In the example illustrated, there are 736 multiplies in the first multiplier 904. This number represents the number of samples captured for the first burst of the synchronization sequence waveform. The second multiplier 908 performs 96 multiplies for the 96 samples collected for the second burst of the synchronization sequence waveform.

Figure 17:
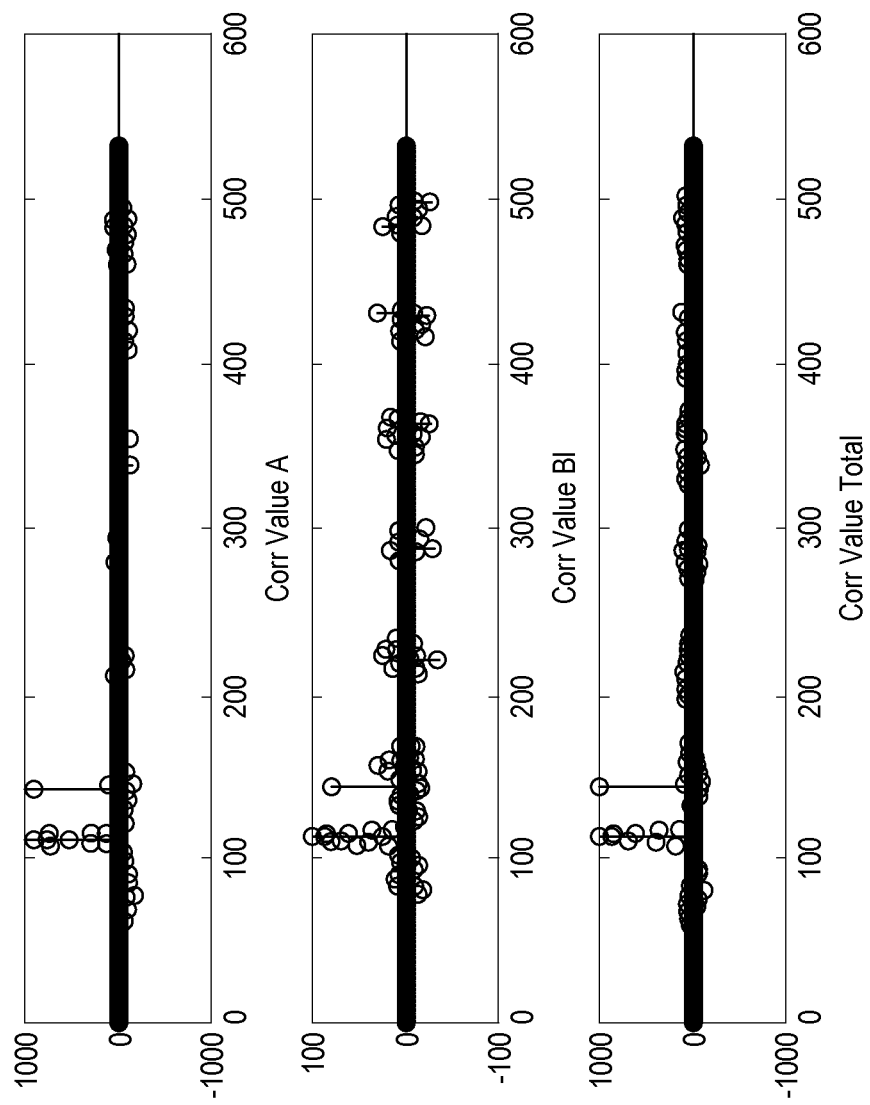
FIG. 17 illustrates sample values for a coarse acquisition.

The results of the multiplies for each of the multipliers is added as illustrated at 912 and 914. The results of the additions of the different multipliers are also added together to achieve the correlation value for the Coarse Acquire value (Corr_Val_Coarse). Note that the summation from the first burst is delayed by the time between bursts minus the time it took to perform the summation at 912 when summing the summations from the first and second bursts to account for the time between bursts. A graph illustrating the various correlation values obtained for coarse correlation is illustrated in FIG. 17.

Figure 18:
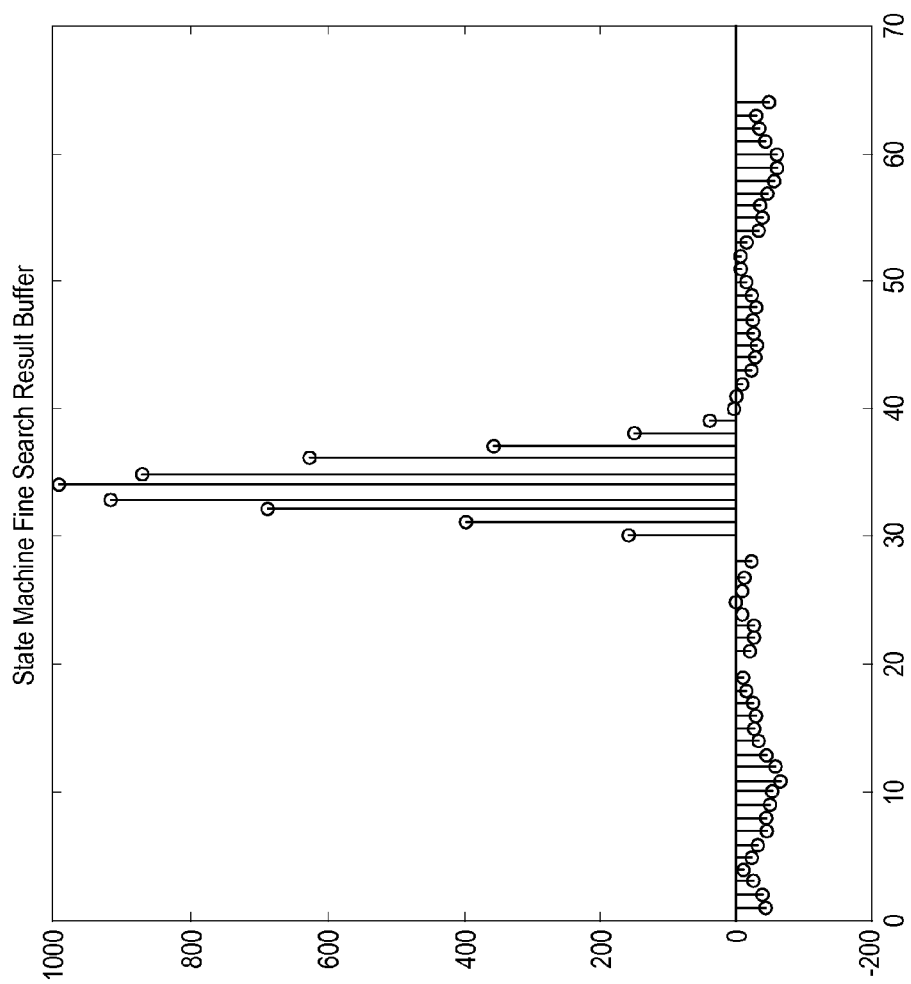
FIG. 18 illustrates sample values for fine tracking.

For determining the Fine Acquire value (Corr_Val_Fine), a filter 916 is applied to the Coarse Acquire signal. A graph illustrating the various correlation values obtained for fine correlation is illustrated in FIG. 18.

Figure 10:
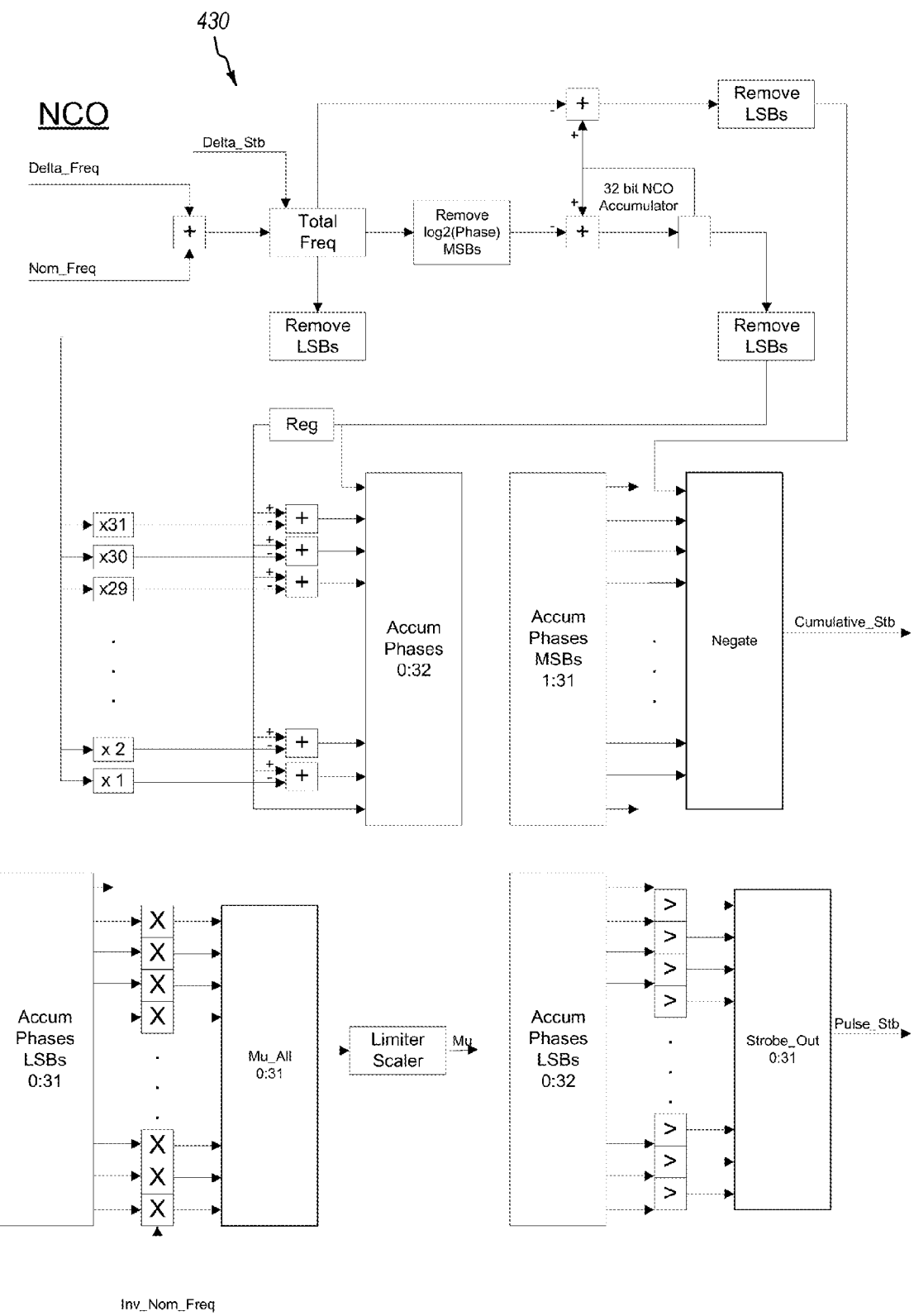
FIG. 10 illustrates a numeric controlled oscillator.

As illustrated, the particular example illustrated herein uses an NCO to control data recovery in a feed forward fashion. The NCO 430 is illustrated in more detail in FIG. 10. However, as illustrated above, the NCO 430 can be controlled in a feedforward fashion rather than traditional feedback clock and data recovery.

Figure 11:
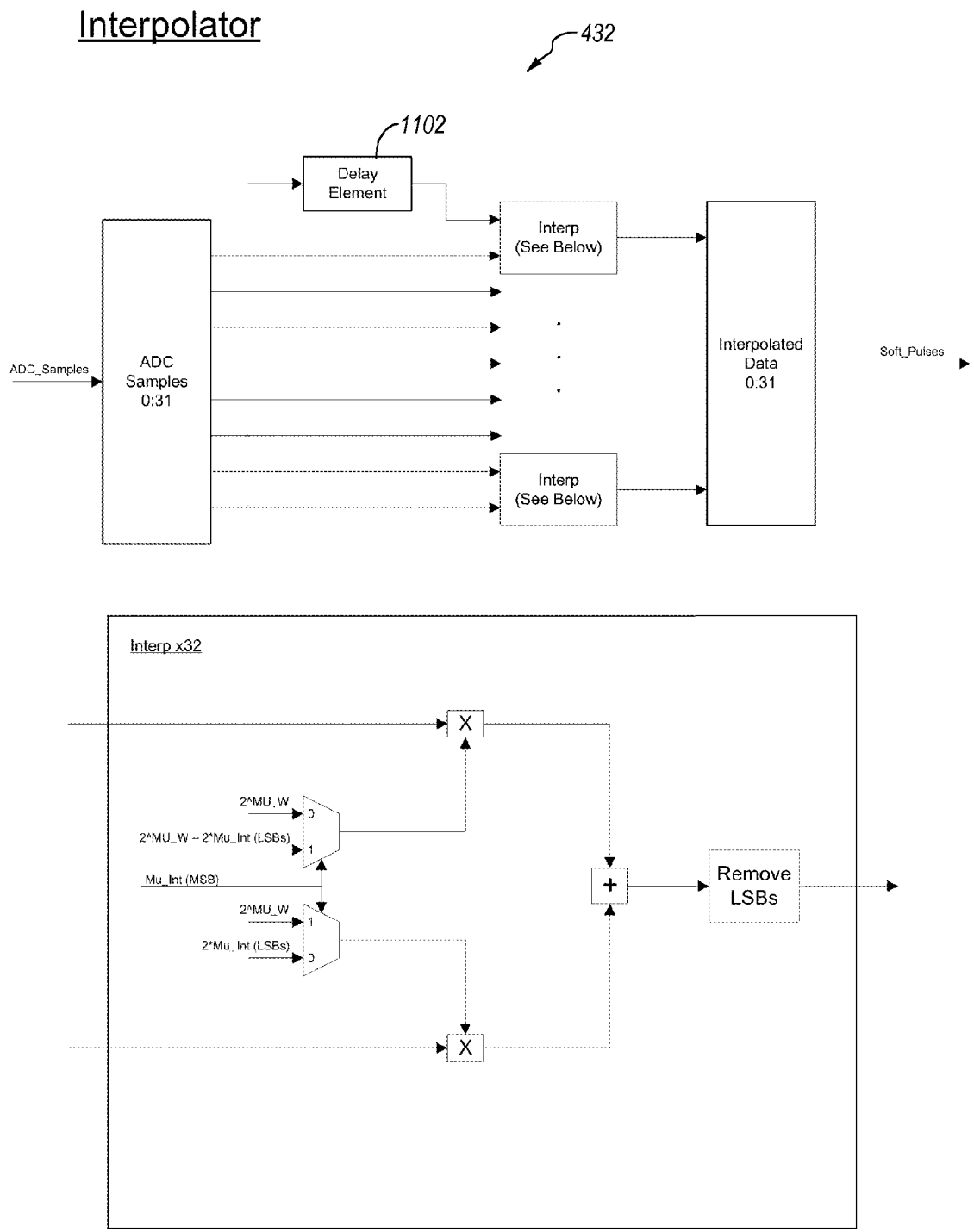
FIG. 11 illustrates an interpolator.

The particular example also includes an interpolator 432. Details of the interpolator are illustrated in FIG. 11. The interpolator 432 can also use offset information obtained by the correlators to interpolate data. As illustrated in FIG. 4, the interpolator is coupled to the ADC 120 and receives data samples from the ADC. However, as noted previously, the samples may be at inconvenient times, such as at or near nulls in the data. However, the functionality described above can be used to identify an offset from a sample point provided by the ADC to where an ideal sample point would be. The interpolator can then weight incoming samples based on the offset. This weighting can be used for data extraction. Thus, samples from the ADC that are close to ideal sample points as indicated by a small offset will be weighted higher than sample points from the ADC that are further away from an ideal sample point as indicated by a larger offset. The interpolator 432 shown in FIG. 11 includes a delay element 1102. This delay element is included and causes a delay of a sufficient amount of time to allow correlations as described above to be performed to identify the offset between the received samples from the ADC 120 and ideal sample points of a data stream waveform.

Figure 12:
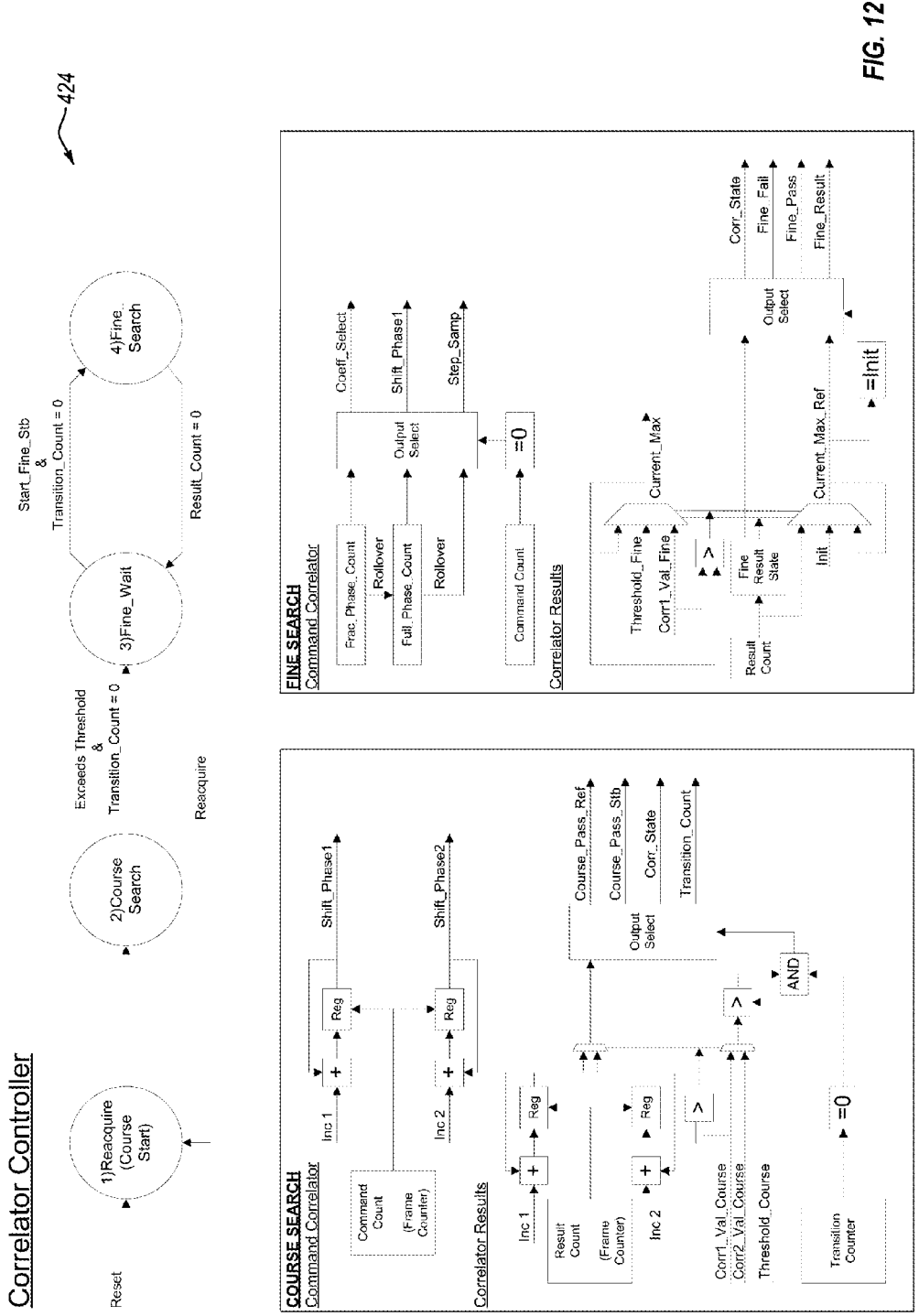
FIG. 12 illustrates a correlator controller.
Figure 13:
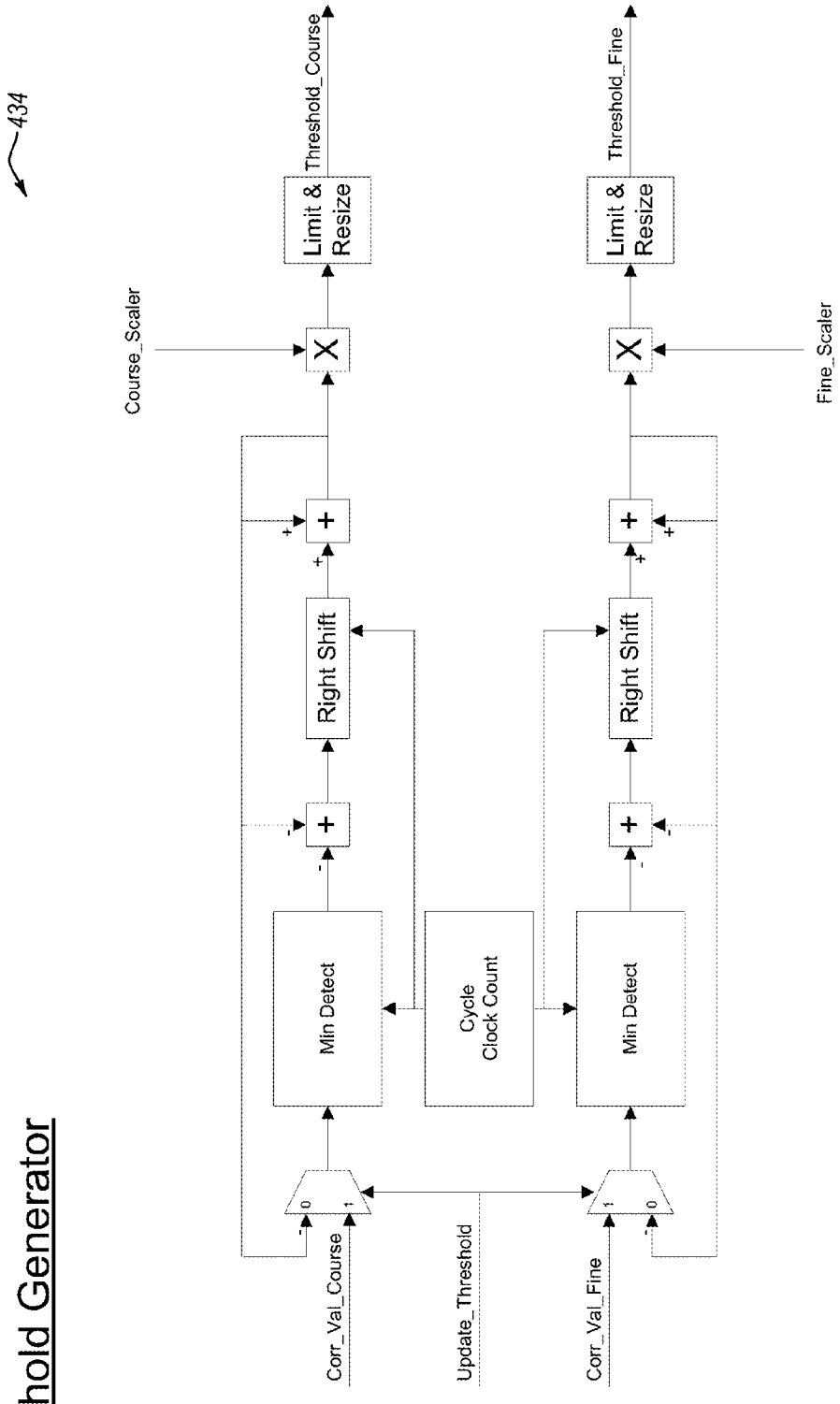
FIG. 13 illustrates a threshold generator.
Figure 14:
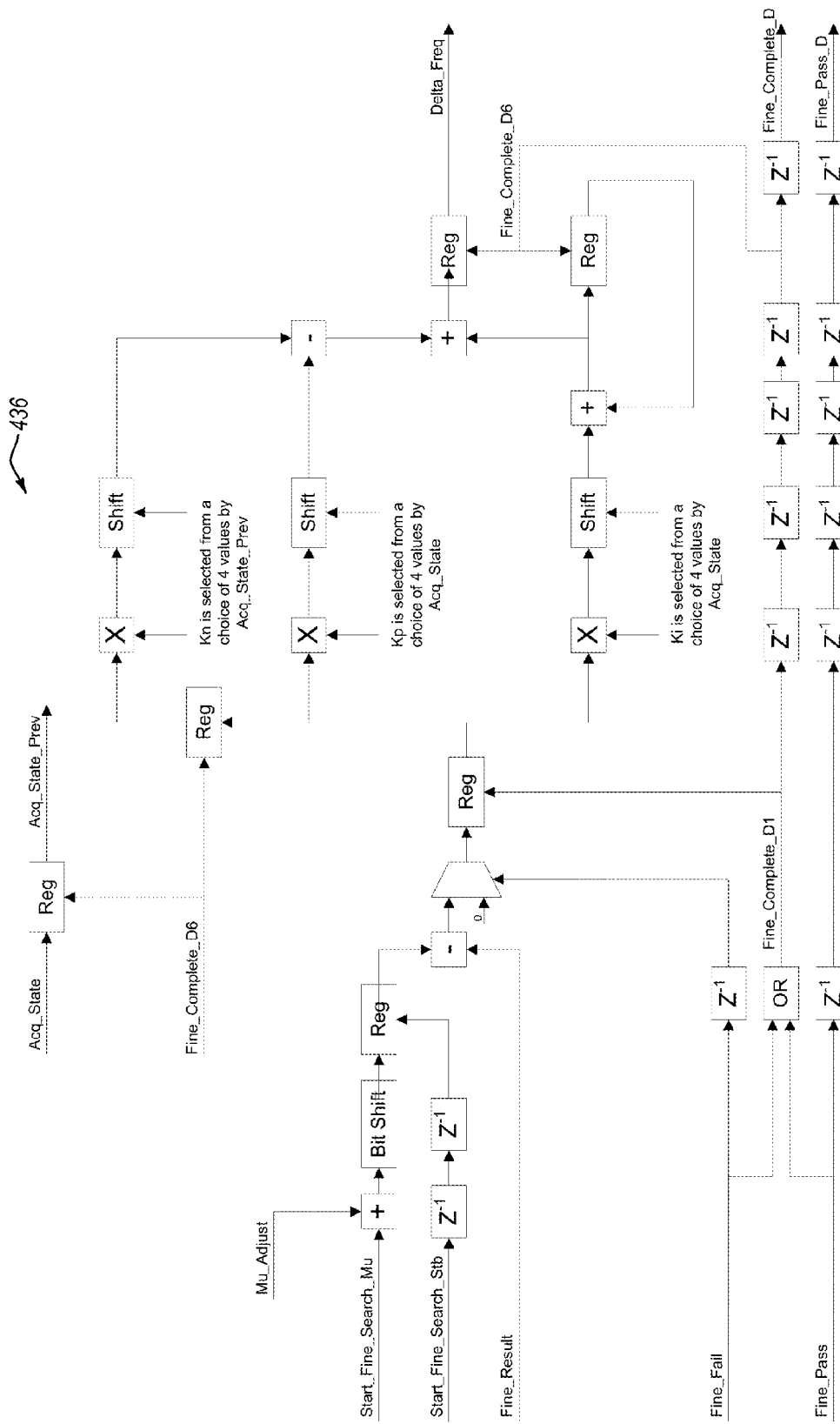
FIG. 14 illustrates a loop filter.
Figure 15:
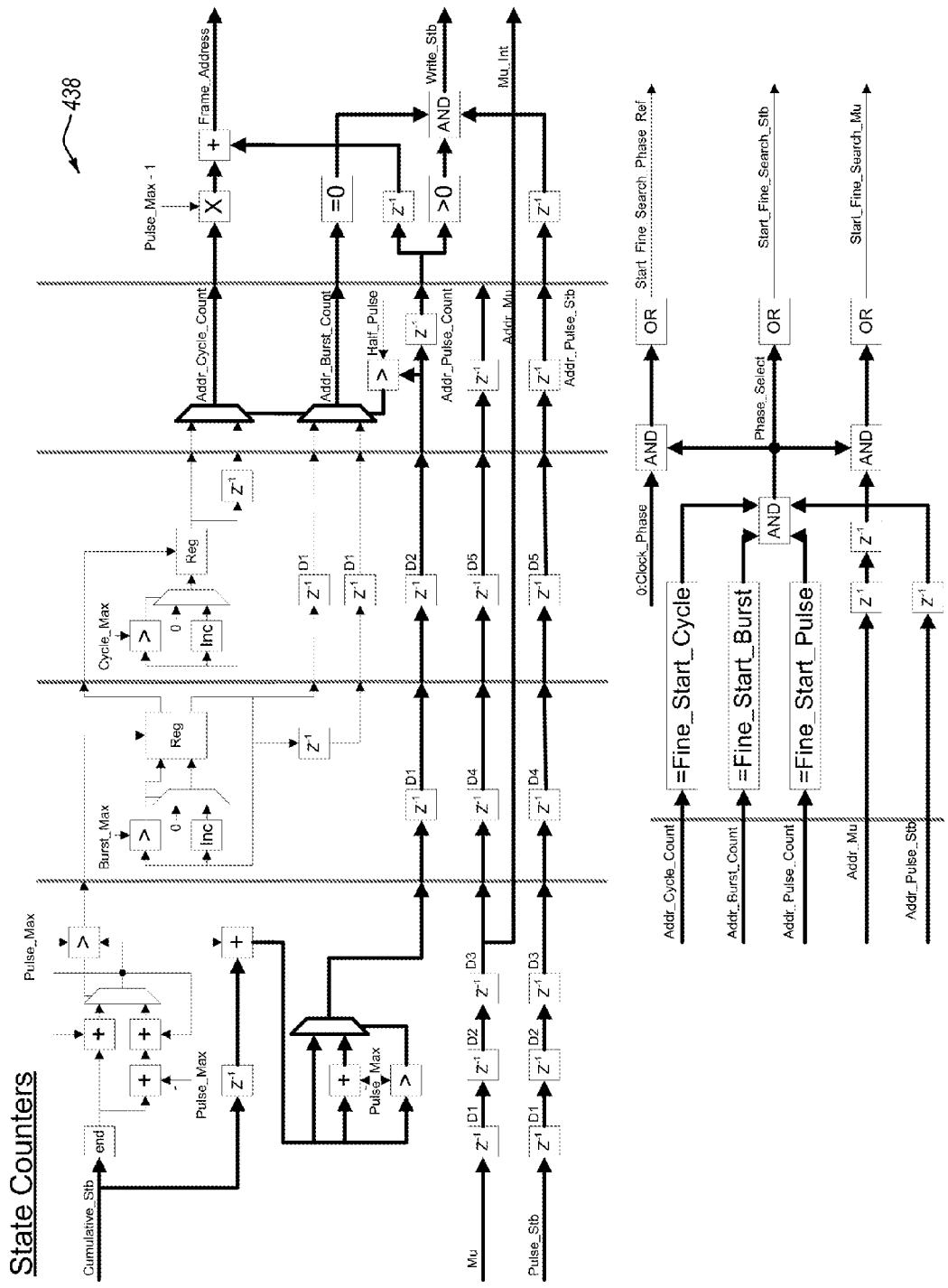
FIG. 15 illustrates state counters.
Figure 16:
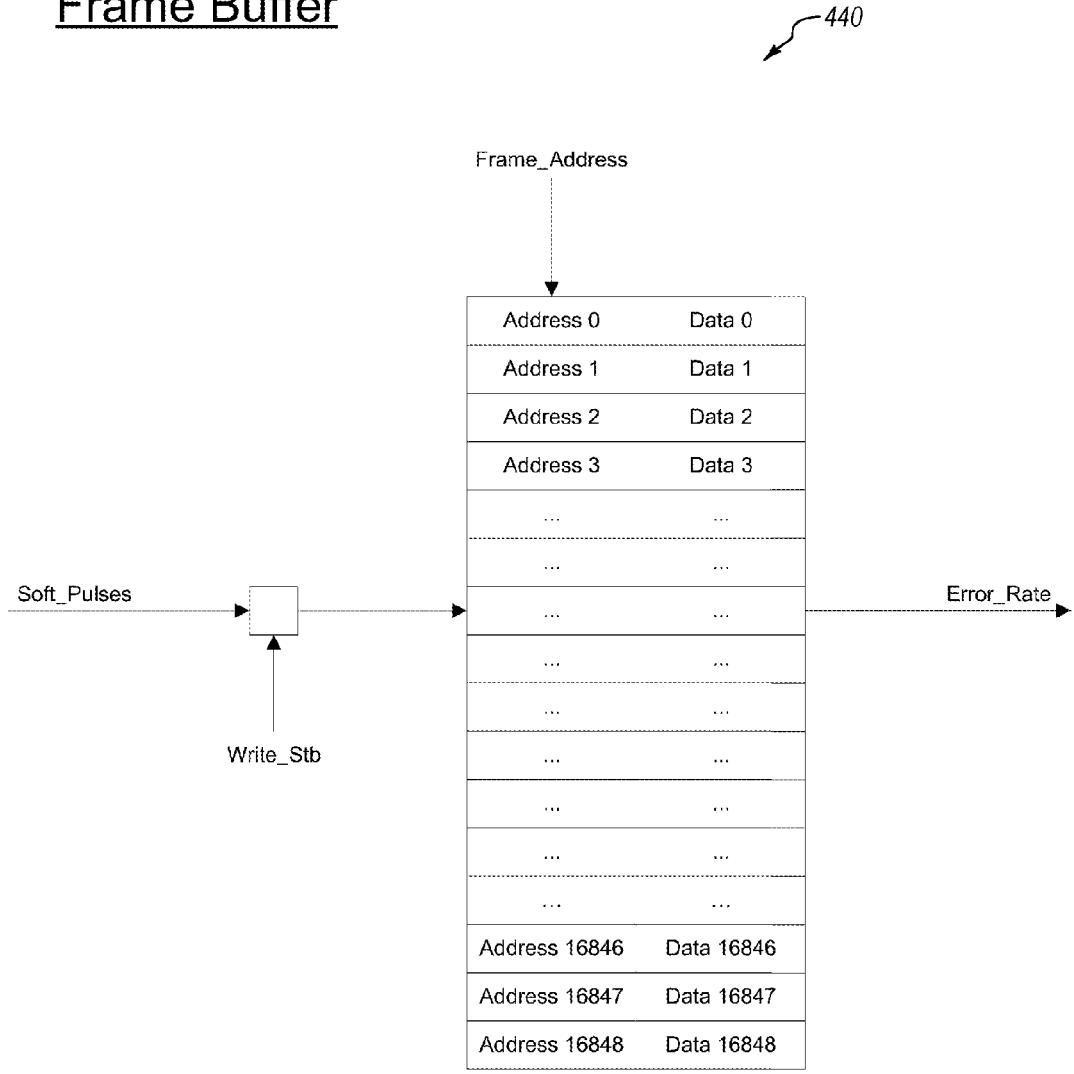
FIG. 16 illustrates a frame buffer.

Various other elements are included in the system 402. For example, as discussed earlier, the system 402 includes a correlator controller 424. Details of the correlator controller 424 are illustrated in FIG. 12. The system 402 includes a threshold generator 434. Details of the threshold generator 434 are illustrated in FIG. 13. The system 402 includes a loop filter 436. Details of the loop filter 436 are illustrated in FIG. 14. The system 402 includes state counters 438. Details of the state counters 438 are illustrated in FIG. 15. The system 402 includes a frame buffer 440. Details of the frame buffer 440 are illustrated in FIG. 16.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 19:
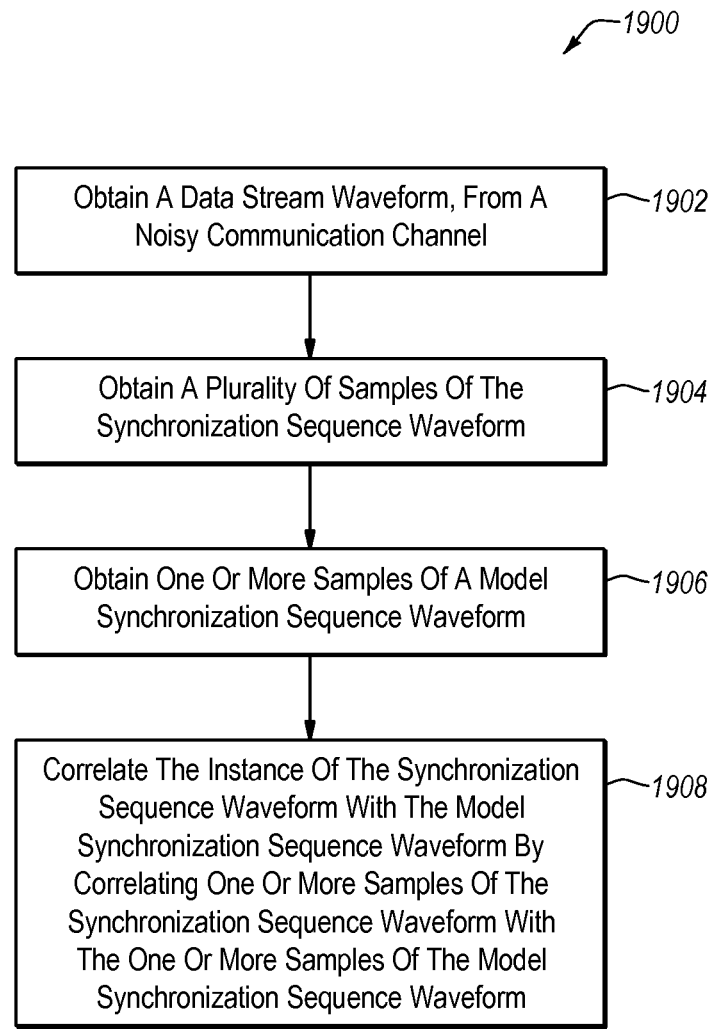
FIG. 19 illustrates a method of detecting timing of a synchronization sequence included in a data stream transmitted in a noisy channel.

Referring now to FIG. 19, a method 1900 is illustrated. The method 1900 may be practiced in a communication system. The method 1900 includes acts for detecting timing of a synchronization sequence included in a data stream transmitted in a noisy channel. The synchronization sequence is a known data sequence purposely injected into the data stream for clock and data recovery. The method 1900 includes obtaining a data stream waveform, from a noisy communication channel (act 1902), the data stream waveform includes an instance of a synchronization sequence waveform. For example, as illustrated in FIG. 3, a waveform may be obtained for the data stream 300 from the channel 106, where the waveform includes one or more instances of the synchronization sequence waveform 110.

The method 1900 further includes obtaining one or more samples of the synchronization sequence waveform (act 1904) For example, samples 301 could be obtained from an instance 110-1 of the synchronization sequence waveform 110.

The method 1900 further includes obtaining one or more samples of a model synchronization sequence waveform (act 1906). As noted, the model synchronization sequence waveform models an expected waveform for the synchronization sequence 102 being transmitted on the communication channel 106 by applying the synchronization sequence 102 to a model 104 of the communication channel 102. Samples of the model synchronization sequence waveform may be obtained by using a ADC, such as ADC 120.

The method 1900 further includes correlating the instance of the synchronization sequence waveform with the model synchronization sequence waveform by correlating one or more samples of the synchronization sequence waveform with the one or more samples of the model synchronization sequence waveform. Correlating can be performed to identify a threshold point where the samples are sufficiently correlated.

The method 1900 may be practiced where acts 1902 through 1908 are repeated with different instances of the synchronization sequence waveform in the data stream waveform to identify a correlation of an instance of the synchronization sequence waveform and the model synchronization sequence waveform that meets a predetermined threshold to perform a coarse search of the data stream waveform to identify an approximate location of an instance of the synchronization sequence waveform in the data stream waveform.

The method 1900 may be practiced where when correlating indicates a sufficiently high correlation, the method further includes causing data to be captured in a next instance, and doing the fine grained correlation. As illustrated above, embodiments can reuse same hardware for coarse and fine correlations. Note that while "a next instance" is referred to, the next instance does not need to be used. Rather, simply a subsequent instance can be used. In particular, often multiple coarse correlations will be gathered and averaged before switching to fine grained correlation.

The method 1900 may be practiced where acts 1902 through 1908 are repeated with different sets of samples of the model synchronization sequence waveform, each set of samples representing a different alignment of the model synchronization sequence waveform such that different alignments of the model synchronization sequence waveform are correlated with an instance of the synchronization sequence waveform to identify an alignment of the model synchronization sequence waveform that when correlated with the instance of the synchronization sequence waveform meets a predetermined condition. This may be done as part of the process of performing a fine correlation. In the fine correlation process, the acts may be performed as part of obtaining an offset estimate for the data stream waveform. Alternatively or additionally, the acts are performed as part of obtaining data rate estimate for the data stream waveform.

For the fine correlation, correlating may be performed offline using stored sample values of an instance of a waveform representing the synchronization sequence in the received communication signal waveform such that different time alignment values are correlated to the same sample values for the same instance of a waveform representing the synchronization sequence in the received communication signal waveform.

The method 1900 may be practiced where acts 1902 through 1908 are repeated with different sets of samples of the model synchronization sequence waveform, each set of samples representing a different alignment of the model synchronization sequence waveform and different sets of samples for different instances of the synchronization sequence waveform such that different alignments of the model synchronization sequence waveform are correlated with different instances of the synchronization sequence waveform.

The method 1900 may be particularly useful in low SNR environments. Thus, in some embodiments, the method may be practiced where the communication channel has a signal to noise ratio that is less than −3 dB.

The method 1900 may further include using results of correlating the instance of the synchronization sequence waveform with the model synchronization sequence waveform to implement a feed forward clock recovery. For example, feed forward signals may be provided to the NCO 430.

The method 1900 may be practiced where acts 1902 through 1908 are repeated with different sets of samples of the model synchronization sequence waveform to identify an offset that is then used to weight incoming samples. For example, as illustrated in FIG. 4, the interpolator may use a determined offset to weight samples captured from the ADC 120. This weighting may be used for data extraction.

As illustrated above, some embodiments of invention described herein can use a model-based correlator to detect a large synchronization sequence at low signal to noise ratios (SNRs)—including distributed synch sequences with temporal gaps. Embodiments may addresses the sample stewing across a long sequence due to modest over-sampling. It can also address coherent recovery of data from adjacent samples. A set of optimal correlation functions at various timing offsets and offset resolutions are computed and stored in memory. These are loaded into a bank of parallel filters to detect the synchronization sequence header. SNR is benefited via coherent combining of certain samples but not others. Control is simplified via the use of a numerically controlled oscillator (NCO). Accommodations are provided to enable feed-forward tracking NCO operation despite very infrequent error updates. Embodiments may enable coarse acquisition and fine tracking with a common circuit via aliased re-use of the fine circuit during coarse acquisition—effectively cutting a very large parallel processing correlator resource requirement in half.

Further, embodiments may be practiced using a computer system including one or more processors and computer-readable media such as computer memory. In particular, the computer memory may store computer-executable instructions that when executed by one or more processors cause various functions to be performed, such as the acts recited in the embodiments.

The functionality described herein can be performed, at least in part, by one or more hardware logic components. For example, and without limitation, illustrative types of hardware logic components that can be used include: Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Embodiments implementing the functionality described herein may be particularly useful for fading channels. A traditional timing error detector only has one output signal, the error signal. By using correlation, embodiments can have two outputs, namely the location of the correlation peak and its magnitude. The correlation location is used as the timing error signal that feeds the loop filter.

However embodiments also have magnitude available. This provides a quality value for each error value. With the quality value it can be determined whether or not to use that particular error value. Alternatively or additionally, embodiments may use error values, but may apply a weighting to each error value based on the quality value for each error value as determined from the magnitude.

During a fade, when the signal level drastically decreases temporarily, the quality (magnitude) of the error value declines, and then the corresponding error value (peak location) is ignored. This allows for the NCO to free-wheel through a fade. In other system, to free-wheel through a fade, those systems have a separate fade detection block. In contrast, using the principles described herein, fade detection and timing error calculations are in the same block, and are available at the same time with a 1:1 relationship. Additionally the error detector can detect offsets of many symbols. Traditional error detectors wrap around every symbol, which can result in bit slips during fades. When coming back from a fade, embodiments can be implemented that will not result in a bit slip.

Previously, timing loops relied on many noisy error values. Synchronization techniques described herein can provide very infrequent, but highly precise error signals for the loop filter to adjust on. As such loop-filters and acquisition state machines can be optimized to work with such inputs. Illustratively, there is delay in the loop caused by all of the correlation values that must be calculated based on the captured received samples. The loop also updates at a very slow rate, once every synchronization sequence. This means that there are many clock cycles (such as FPGA clock cycles) available for each loop update. And that the delay, while significant, is still less than the loop update time. Therefore, as illustrated in FIG. 14 embodiments may include a third branch to the loop filter, in addition to the proportional and integral branches. This third branch scales the previous error value, and is subtracted from the sum of the proportional and integral branches of the loop filter. This allows embodiments to compensate for overshoot, caused by the loop delay. This aids in quick acquisition when transitioning from the coarse search to the fine search. In many situations, fast acquisition is important. If the integral path does not converge quickly, the synchronization sequence may drift out of the location that the fine search was focused on, and may never acquire. Compensating for the loop delay, allows for a high loop gain during the offset estimation state, because the overshoot is compensated. This then also provides an accurate estimation of the initial rate offset, used to initially set the integral path of the loop filter. The rate estimation state can also use high gains, because the overshoot would not impact the remaining acquisition stages.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a communication system, a method of detecting timing of a synchronization sequence included in a data stream transmitted in a noisy channel, the synchronization sequence being a known data sequence purposely injected into the data stream for clock synchronization, the method comprising:
   a) obtaining a data stream waveform, from a communication channel, the data stream waveform comprising an instance of a synchronization sequence waveform;
   b) obtaining a plurality of samples of the synchronization sequence waveform;
   c) obtaining one or more samples of a model synchronization sequence waveform, wherein the model synchronization sequence waveform models an expected waveform for the synchronization sequence being transmitted on the communication channel by applying the synchronization sequence to a model of the communication channel; and
   d) correlating the instance of the synchronization sequence waveform with the model synchronization sequence waveform by correlating one or more samples of the synchronization sequence waveform with the one or more samples of the model synchronization sequence waveform.

2. The method of claim 1, wherein acts a-d are repeated with different instances of the synchronization sequence waveform in the data stream waveform to identify a correlation of an instance of the synchronization sequence waveform and the model synchronization sequence waveform that meets a predetermined threshold to perform a coarse search of the data stream waveform to identify an approximate location of an instance of the synchronization sequence waveform in the data stream waveform.

3. The method of claim 1, wherein when correlating indicates a correlation meeting a determined threshold, the method further includes causing data to be captured in a next instance, and doing a fine grained correlation.

4. The method of claim 1, wherein acts a-d are repeated with different sets of samples of the model synchronization sequence waveform, each set of samples representing a different alignment of the model synchronization sequence waveform such that different alignments of the model synchronization sequence waveform are correlated with an instance of the synchronization sequence waveform to identify an alignment of the model synchronization sequence waveform that when correlated with the instance of the synchronization sequence waveform meets a predetermined condition.

5. The method of claim 4, wherein the acts are performed as part of obtaining an offset estimate for the data stream waveform.

6. The method of claim 4, wherein the acts are performed as part of obtaining data rate estimate for the data stream waveform.

7. The method of claim 4, wherein the predetermined condition comprises identifying an alignment of the model synchronization sequence waveform that has the greatest correlation with the synchronization sequence waveform.

8. The method of claim 4, wherein correlating is performed offline using stored sample values of an instance of a waveform representing the synchronization sequence in the received communication signal waveform such that different time alignment values are correlated to the same sample values for the same instance of a waveform representing the synchronization sequence in the received communication signal waveform.

9. The method of claim 1, wherein acts a-d are repeated with different sets of samples of the model synchronization sequence waveform, each set of samples representing a different alignment of the model synchronization sequence waveform and different sets of samples for different instances of the synchronization sequence waveform such that different alignments of the model synchronization sequence waveform are correlated with different instances of the synchronization sequence waveform.

10. The method of claim 1, wherein the communication channel has a signal to noise ratio that is less than −3 dB.

11. The method of claim 1, wherein obtaining one or more samples of the synchronization sequence waveform comprises obtaining samples at a rate below Nyquist frequency.

12. The method of claim 1, further comprising using results of correlating the instance of the synchronization sequence waveform with the model synchronization sequence waveform to implement a feed forward clock recovery.

13. The method of claim 1, wherein the communication signal is a burst signal.

14. The method of claim 1, wherein the model of the communication channel is a noise free model of the communication channel.

15. The method of claim 1, wherein acts a-d are repeated with different sets of samples of the model synchronization sequence waveform to identify an offset that is then used to weight incoming samples.

16. A communication system for detecting timing of a synchronization sequence included in a data stream transmitted in a noisy channel, the synchronization sequence being a known data sequence purposely injected into the data stream for clock and data recovery, the system comprising:
an analog to digital converter (ADC) configured to capture samples of a synchronization sequence waveform from a communications channel;
a first storage coupled to the ADC and configured to store one or more samples of a synchronization sequence waveform;
channel model circuitry, wherein the channel model circuitry is configured to produce one or more samples of a model synchronization sequence waveform, which is a model of the synchronization sequence waveform, wherein the model synchronization sequence waveform models an expected waveform for the synchronization sequence being transmitted on the communication channel by applying the synchronization sequence to the model of the communication channel;
a second storage coupled to the channel model circuitry and configured to store samples of the model synchronization sequence waveform, the second storage configured to store different samples for different alignments of the model synchronization sequence waveform; and
a correlator configured to correlate samples of the synchronization sequence waveform, from the first storage with samples of the model synchronization sequence waveform, from the second storage to identify correlated samples that have a correlation meeting a predetermined threshold.

17. The system of claim 16, wherein the system is configured to acquire a synchronization sequence from a data stream.

18. The system of claim 16, wherein the system is configured to track data in a data stream by identifying an offset within a single instance of a synchronization sequence in the data stream and a data rate of the data stream within a single instance of the synchronization sequence in the data stream by correlating samples of the synchronization sequence waveform with samples of the model synchronization sequence waveform.

19. The system of claim 18, wherein the system is configured to control a numerically controlled oscillator (NCO) in a feedforward fashion using the identified offset and data rate.

20. The system of claim 16, wherein the system is configured to identify an offset in the data stream by correlating samples of the synchronization sequence waveform with samples of the model synchronization sequence waveform and to use the offset to weight incoming data stream samples.

* * * * *